US012586581B2

(12) United States Patent
Wu et al.

(10) Patent No.: US 12,586,581 B2
(45) Date of Patent: Mar. 24, 2026

(54) ELECTRONIC DEVICE CONTROL METHOD AND APPARATUS

(71) Applicant: HUAWEI TECHNOLOGIES CO., LTD., Shenzhen (CN)

(72) Inventors: Jinxian Wu, Shenzhen (CN); Shaowu Pan, Shenzhen (CN); Xiang Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 357 days.

(21) Appl. No.: 18/250,511

(22) PCT Filed: Sep. 1, 2021

(86) PCT No.: PCT/CN2021/116074
§ 371 (c)(1),
(2) Date: Apr. 25, 2023

(87) PCT Pub. No.: WO2022/088964
PCT Pub. Date: May 5, 2022

(65) Prior Publication Data
US 2023/0410806 A1     Dec. 21, 2023

(30) Foreign Application Priority Data

Oct. 31, 2020     (CN) .......................... 202011198245.1

(51) Int. Cl.
*G10L 15/22*          (2006.01)
*G10L 15/30*          (2013.01)
*H04M 3/493*          (2006.01)

(52) U.S. Cl.
CPC .............. *G10L 15/22* (2013.01); *G10L 15/30* (2013.01); *H04M 3/4936* (2013.01); *G10L 2015/228* (2013.01)

(58) Field of Classification Search
CPC ... G10L 15/22; G10L 15/30; G10L 2015/228; G10L 17/04; G10L 15/26; H04M 3/4936;
(Continued)

(56) References Cited

U.S. PATENT DOCUMENTS 10,217,453 B2     2/2019   Stevans et al.
2012/0315880 A1*  12/2012  Peitrow ............. H04M 1/72513
                                                           455/412.1
(Continued)

FOREIGN PATENT DOCUMENTS

CN          105100403 A      11/2015
CN          105652704 A       6/2016
(Continued)

OTHER PUBLICATIONS

Slashout, "The resurrection of the deceased father in the son's mobile phone, which is probably the warmest one of the AI", Blog Garden,Apr. 2019, with English translation, total 9 pages.
(Continued)

*Primary Examiner* — Mark Villena

(57) ABSTRACT

An electronic device control method and apparatus relate to the field of intelligent terminal technologies. An electronic device receives a voice instruction through a voice assistant and determines a current user state of at least one user in an area to which the electronic device belongs. The electronic device may respond to the entered voice instruction based on the current user state of the at least one use and may determine the current user state of the at least one user in the area to which the electronic device belongs, and may respond to the entered voice instruction based on the obtained current user state.

14 Claims, 33 Drawing Sheets

(58) Field of Classification Search
CPC ............. H04M 3/42365; H04M 3/527; H04M 1/72412; H04M 1/72442; H04M 1/72451; H04M 2250/12; H04M 2250/74; H04M 1/72454; H04M 1/72457; H04M 2203/2094; G06F 3/167

See application file for complete search history.

(56) References Cited

U.S. PATENT DOCUMENTS

| | | | | |
|---|---|---|---|---|
| 2017/0068550 A1* | 3/2017 | Zeitlin | .................... | G06F 3/167 |
| 2018/0322870 A1* | 11/2018 | Lee | .................... | H04N 21/4394 |
| 2019/0279615 A1* | 9/2019 | Ben-Dor | ............. | H04L 41/0893 |

FOREIGN PATENT DOCUMENTS

| | | |
|---|---|---|
| CN | 105791518 A | 7/2016 |
| CN | 105872746 A | 8/2016 |
| CN | 109348068 A | 2/2019 |
| CN | 109376669 A | 2/2019 |
| CN | 110021300 A | 7/2019 |
| CN | 110430529 A | 11/2019 |
| CN | 110622126 A | 12/2019 |
| CN | 110944056 A | 3/2020 |
| IN | 201841019106 A | 11/2019 |
| WO | 2018097968 A1 | 5/2018 |
| WO | 2018161014 A1 | 9/2018 |

OTHER PUBLICATIONS

Alidamo Monastery Sweeping Monk, "[Full Record] This mother who lost her only child made her daughter into an AI", bilibili, URL:https://www.bilibili.com/video/av83723889/?redirectFrom=h5, Jan. 16, 2020, Duration: 4 minutes and 38 seconds.

* cited by examiner

TO

CONT. FROM

CONT. FROM

TO

CONT. FROM

Electronic device 1

TO

CONT. FROM

CONT. FROM

CONT. FROM

TO

CONT. FROM

Electronic device 1

5G 5G

20:30

Cast

The large-screen device is
being used to play a movie

Video introduction

TO

ELECTRONIC DEVICE CONTROL METHOD AND APPARATUS

CROSS-REFERENCE TO RELATED APPLICATIONS

This application is a National Stage of International Application No. PCT/CN2021/116074 filed on Sep. 1, 2021, which claims priority to Chinese Patent Application No. 202011198245.1 filed on Oct. 31, 2020. Both of the aforementioned applications are hereby incorporated by reference in their entireties.

TECHNICAL FIELD

This application relates to the field of intelligent terminal technologies, and in particular, to an electronic device control method and an apparatus.

BACKGROUND

Currently, an electronic device may intelligently interact with a user through intelligent conversation and instant question answering, to help the user resolve a problem, and provide an intelligent and convenient voice assistant service for the user. However, a current voice assistant service on the electronic device can consider a requirement of only the user, but cannot fully consider an environment in which the user is located. Therefore, the current voice assistant service is not intelligent enough, and cannot meet requirements of a plurality of users.

SUMMARY

This application relates to an electronic device control method and an apparatus, to improve performance of a voice assistant service.

According to a first aspect, an embodiment of this application provides an electronic device control method. The method may be performed by an electronic device provided in an embodiment of this application, or may be performed by a chip that has a function similar to that of an electronic device. In the method, the electronic device may receive a voice instruction entered by a user by using a voice assistant on the electronic device; the electronic device may determine a current user state of at least one user in an area to which the electronic device belongs; and the electronic device may respond to the entered voice instruction based on the current user state of the at least one user.

Based on the solution, when receiving the voice instruction, the electronic device may determine the current user state of the at least one user in the area to which the electronic device belongs, and may respond to the entered voice instruction based on the obtained current user state. Therefore, requirements of more users can be considered, so that the voice assistant can more intelligently serve the user, to improve performance of the voice assistant.

In a possible implementation, when determining the current user state of the at least one user in the area to which the electronic device belongs, the electronic device may determine at least one target device in the area to which the electronic device belongs; the electronic device may send a first request message to the at least one target device, where the first request message may be used to obtain the current user state; the at least one target device may obtain the current user state in a range that can be monitored, and send the current user state to the electronic device; and the electronic device may receive at least one current user state from the at least one target device.

Based on the solution, the electronic device may determine the at least one target device in the area to which the electronic device belongs, and obtain the current user state of the at least one user by communicating with the at least one target device.

In a possible implementation, if there is a first user state in the at least one current user state, the electronic device may perform an operation corresponding to the voice instruction, where the first user state herein represents a noise environment required by a user; or if there is no first user state in the at least one current user state, the electronic device may search for at least one peripheral device in a current network connection; and the electronic device may perform, by using the at least one peripheral device, an operation corresponding to the voice instruction.

Based on the solution, the electronic device may select, based on the noise environment required by the user, different manners to execute the entered voice instruction, so that the voice assistant is more intelligent, and considers requirements of more people.

In a possible implementation, the at least one target device has a target user identifier, the electronic device has a user identifier, and the user identifier and the target user identifier herein are in a same voice assistant group.

Based on the solution, devices of different users may be added to a same voice assistant group by using user identifiers, so that communication between the users can be more convenient by using the voice assistant group.

In a possible implementation, the electronic device may generate first information in response to the voice instruction, where the voice instruction herein includes event information and a time point, and therefore the first information may also include the event information and the time point; and the electronic device may send the first information to at least one target device.

Based on the solution, the electronic device may send, to the at least one target device by using a voice assistant group, a reminder message set for the another user, so that the voice assistant is more intelligent.

According to a second aspect, this application provides a control method for a first electronic device. The method may be performed by an electronic device provided in this application, or may be performed by a chip that has a function similar to that of an electronic device. In the method, the electronic device may receive a first request message from the first electronic device, where the first request message may be used by the first electronic device to obtain a current user state; and the electronic device may obtain the current user state; and send the current user state to the first electronic device.

Based on the solution, the electronic device may obtain the current user state based on the request message from the first electronic device, and send the current user state to the first electronic device, so that the first electronic device can execute, based on the current user state, a voice instruction entered by a user, and a voice assistant service can consider requirements of more people, to improve performance of the voice assistant service.

In a possible implementation, the electronic device may obtain the current user state by using a sensor; and/or obtain the current user state by collecting information that is set by a user.

Based on the solution, the electronic device may quickly and conveniently obtain the current user state based on the sensor or the information that is set by the user.

In a possible implementation, the at least one electronic device has a target user identifier, the first electronic device has a user identifier, and the user identifier and the target user identifier herein are in a same voice assistant group.

Based on the solution, devices of different users may be added to a same voice assistant group by using user identifiers, so that communication between the users can be more convenient by using the voice assistant group.

In a possible implementation, the electronic device may receive first information, where the first information may include event information and a time point; and the electronic device may display the event information based on the time point.

Based on the solution, the electronic device may receive a reminder message set for the electronic device from another user, and display the reminder message at a reminder time point.

According to a third aspect, an embodiment of this application provides an electronic device control method. The method may be performed by an electronic device provided in an embodiment of this application, or may be performed by a chip that has a function similar to that of an electronic device. In the method, the electronic device may receive a voice instruction entered by a user by using a voice assistant; and the electronic device may respond to the voice instruction, and send the voice instruction to a second electronic device, where the electronic device has a first user identifier, the second electronic device has a second user identifier, and the first user identifier and the second user identifier are in a same voice assistant group.

Based on the solution, the electronic device may generate a reminder message for another user in the group by using the voice assistant group, and different users may communicate with each other by using the voice assistant group, so that a voice assistant service is more intelligent.

In a possible implementation, the electronic device may generate a corresponding first message in response to the voice instruction, where the first message may include event information and a time point; and the electronic device may send the first message to the second electronic device, so that the second electronic device can display time information based on the time point.

Based on the solution, the electronic device may generate a corresponding reminder message based on the voice instruction entered by the user, and send the reminder message to another user in the voice assistant group, so that the another user can receive the reminder message.

In a possible implementation, the electronic device may send, by using the voice assistant on the electronic device, the voice instruction to a voice assistant corresponding to the second user identifier.

Based on the solution, the electronic device may send the voice instruction to a voice assistant of another user in the voice assistant group by using the voice assistant, so that a reminder message can be securely and quickly set for the another user.

According to a fourth aspect, an embodiment of this application provides an electronic device control method. The method may be performed by an electronic device provided in an embodiment of this application, or may be performed by a chip that has a function similar to that of an electronic device. In the method, the electronic device may receive a voice instruction from a first electronic device; the electronic device may generate a first message based on the voice instruction, where the first message herein may include event information and a time point; and the electronic device may display the event information based on the time point; or the electronic device may receive a first message from a first electronic device, where the first message herein may include event information and a time point; and the electronic device may display the event information based on the time point, where the first electronic device has a first user identifier, the electronic device has a second user identifier, and the first user identifier and the second user identifier may be in a same voice assistant group.

Based on the solution, different users may set a reminder message for another user in the group by using the voice assistant group, and after the user receives the reminder message, the user may be reminded when a reminder time point arrives, so that a voice assistant service can be more intelligent.

In a possible implementation, the electronic device may receive the first message from a voice assistant on the first electronic device by using a voice assistant.

Based on the solution, the electronic device may receive, by using the voice assistant, a reminder message set by another user for the electronic device, so that the reminder message can be securely and quickly received.

According to a fifth aspect, an embodiment of this application provides a chip. The chip is coupled to a memory in an electronic device, and is configured to: invoke a computer program stored in the memory, and perform the technical solution in any one of the first aspect and the possible designs of the first aspect, perform the technical solution in any one of the second aspect and the possible implementations of the second aspect, perform the technical solution in any one of the third aspect and the possible implementations of the third aspect, or perform the technical solution in any one of the fourth aspect and the possible implementations of the fourth aspect of embodiments of this application. In this embodiment of this application, "coupled" means that two components are directly or indirectly combined with each other.

According to a sixth aspect, an embodiment of this application further provides a circuit system. The circuit system may be one or more chips, for example, a system-on-a-chip (system-on-a-chip, SoC). The circuit system includes at least one processing circuit. The at least one processing circuit is configured to: perform the technical solution in any one of the first aspect and the possible implementations of the first aspect, perform the technical solution in any one of the second aspect and the possible implementations of the second aspect, perform the technical solution in any one of the third aspect and the possible implementations of the third aspect, or perform the technical solution in any one of the fourth aspect and the possible implementations of the fourth aspect.

According to a seventh aspect, an embodiment of this application further provides an electronic device. The electronic device includes modules/units that perform any one of the first aspect or the possible implementations of the first aspect; the electronic device includes modules/units that perform any one of the second aspect or the possible implementations of the second aspect; the electronic device includes modules/units that perform any one of the third aspect and the possible implementations of the third aspect; or the electronic device includes modules/units that perform any one of the fourth aspect and the possible implementations of the fourth aspect. These modules/units may be implemented by hardware, or may be implemented by hardware by executing corresponding software.

According to an eighth aspect, an embodiment of this application further provides a computer-readable storage medium. The computer-readable storage medium includes a computer program, and when the computer program is run on an electronic device, the electronic device is enabled to perform the technical solution in any one of the first aspect and the possible implementations of the first aspect of embodiments of this application, perform the technical solution in any one of the second aspect and the possible implementations of the second aspect of embodiments of this application, perform the technical solution in any one of the third aspect and the possible implementations of the third aspect of embodiments of this application, or perform the technical solution in any one of the fourth aspect and the possible implementations of the fourth aspect of embodiments of this application.

According to a ninth aspect, an embodiment of this application provides a program product, including instructions. When the program product is run on an electronic device, the electronic device is enabled to perform the technical solution in any one of the first aspect and the possible implementations of the first aspect of embodiments of this application, perform the technical solution in any one of the second aspect and the possible implementations of the second aspect of embodiments of this application, perform the technical solution in any one of the third aspect and the possible implementations of the third aspect of embodiments of this application, or perform the technical solution in any one of the fourth aspect and the possible implementations of the fourth aspect of embodiments of this application.

In addition, for beneficial effects of the fifth aspect to the ninth aspect, refer to the beneficial effects of the first aspect and the fourth aspect. Details are not described herein.

BRIEF DESCRIPTION OF DRAWINGS

FIG. 13A-1 and FIG. 13A-2 are a schematic diagram of a scenario of an electronic device control method according to an embodiment of this application;

FIG. 13B-1 and FIG. 13B-2 are a schematic diagram of a scenario of an electronic device control method according to an embodiment of this application;

FIG. 14A-1 and FIG. 14A-2 are a schematic diagram of a scenario of an electronic device control method according to an embodiment of this application;

FIG. 14C-1, FIG. 14C-2, and FIG. 14C-3 are a schematic diagram of a scenario of an electronic device control method according to an embodiment of this application;

FIG. 14D-1, FIG. 14D-2, and FIG. 14D-3 are a schematic diagram of a scenario of an electronic device control method according to an embodiment of this application;

DESCRIPTION OF EMBODIMENTS

Technical solutions in embodiments of this application are described below in detail with reference to the accompanying drawings in the following embodiments of this application.

Figure 1A:
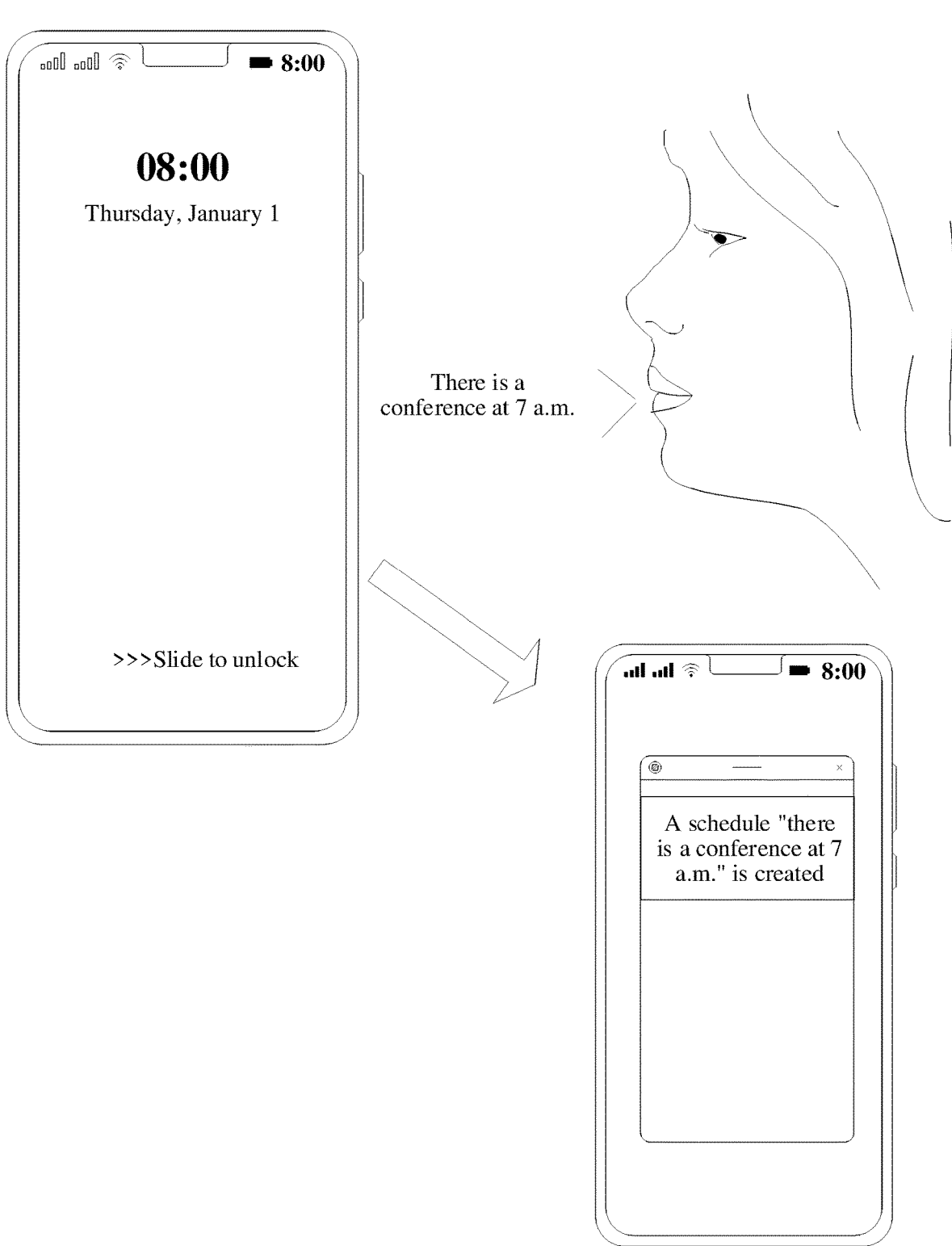
FIG. 1A is a schematic diagram of a voice assistant on an electronic device according to an embodiment of this application.

Currently, an electronic device may intelligently interact with a user through intelligent conversation and instant question answering, to help the user resolve a problem, and provide an intelligent and convenient voice assistant service for the user. Referring to FIG. 1A, the user formulates a schedule for the user by using the voice assistant service. For example, the user may say "there is a conference at 7 am.", and the electronic device may receive voice data of the user, and perform text recognition. The electronic device may create a schedule, that is, "there is a conference at 7:00", based on recognized content, so as to remind the user at 7:00.

Figure 1B:
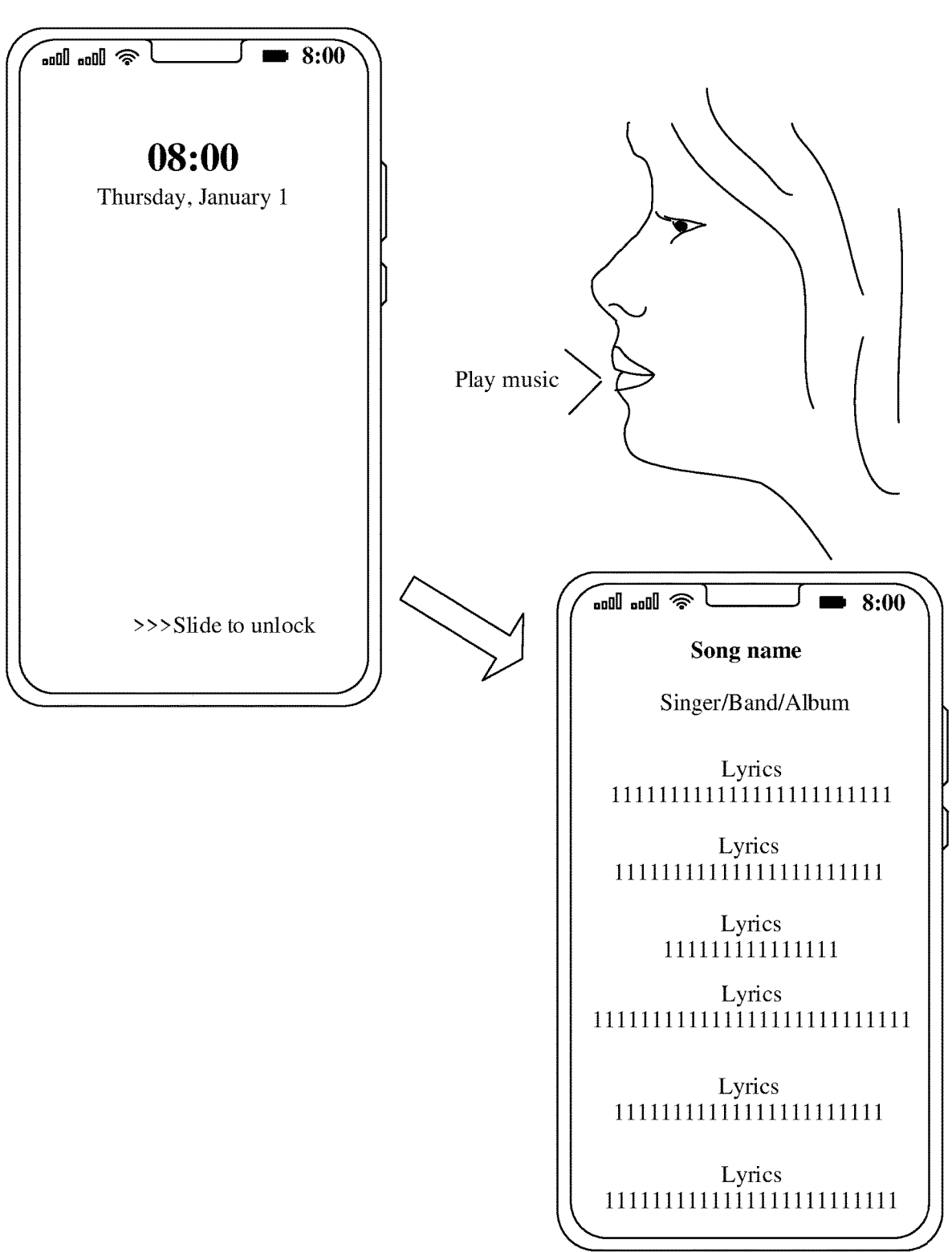
FIG. 1B is a schematic diagram of a voice assistant on an electronic device according to an embodiment of this application.

Referring to FIG. 1B, when the user wants to listen to music, the user may say "play music". The electronic device may recognize a voice of the user, and obtain a related instruction, namely, an instruction for playing music. In this case, the electronic device may start an application that can play music, and play music.

However, a current voice assistant service on the electronic device can consider a requirement only of the user, and cannot implement interaction between a plurality of users. In addition, the current voice assistant service on the electronic device cannot consider an environment in which the user is currently located. For example, a user A wants to listen to music at home, and a user B needs a quiet environment for learning at home. However, when recognizing a voice "play music" of the user A, the electronic device does not consider a requirement of the user B, and still starts the application that can play music, and plays music. In some embodiments, if the electronic device is connected to an external play device, music may be played by using the external play device. In this case, considering that the user B needs a relatively quiet environment, the user A may manually adjust volume to reduce the volume to avoid affecting the user B.

Based on the foregoing technical problem, embodiments of this application provide an electronic device control method, to avoid the foregoing existing problem, so that a voice assistant service can meet requirements of a plurality of users to implement interaction between the plurality of users, and can fully consider an environment in which an electronic device is located, to more intelligently serve the user. Embodiments of this application provide an electronic device control method. The method may be applied to any electronic device, for example, an electronic device having a curved screen, a full screen, or a foldable screen. The electronic device is a mobile phone, a tablet computer, a wearable device (for example, a watch, a band, or a smart helmet), a vehicle-mounted device, a smart home device, an augmented reality (augmented reality, AR) device/a virtual reality (virtual reality, VR) device, a notebook computer, an ultra-mobile personal computer (ultra-mobile personal computer, UMPC), a netbook, a personal digital assistant (personal digital assistant, PDA), or the like.

In embodiments of this application, when receiving a voice instruction entered by a user, the electronic device may determine a current environment by using a sensor, and then may select a proper manner to execute the voice instruction of the user. Therefore, a voice assistant service can consider requirements of a plurality of users, and can more intelligently serve the user.

Terms used in the following embodiments are merely intended to describe specific embodiments, but are not intended to limit this application. The terms "one", "a", "the", and "this" of singular forms used in this specification and the appended claims of this application are also intended to include expressions such as "one or more", unless otherwise specified in the context clearly. It should be further understood that in embodiments of this application, "one or more" means one, two, or more, and the term "and/or" is an association relationship for describing associated objects, and indicates that three relationships may exist. For example, A and/or B may indicate the following cases: Only A exists, both A and B exist, and only B exists, where A and B may be singular or plural. The character "/" usually indicates an "or" relationship between associated objects.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different locations in this specification do not necessarily mean referring to a same embodiment, but mean "one or more but not all of embodiments", unless otherwise specifically emphasized in another manner. The terms "include", "comprise", "have", and variants thereof mean "include but is not limited to", unless otherwise specifically emphasized in another manner.

In embodiments of this application, "at least one" means one or more, and "a plurality of" means two or more. In addition, it should be understood that in the descriptions of this application, terms such as "first" and "second" are merely used for distinguishing and description, but should not be understood as an indication or implication of relative importance, or should not be understood as an indication or implication of a sequence.

In the following embodiments, a mobile phone is used as an example for description. Various applications (application, app) may be installed in the mobile phone, may be briefly referred to as applications, and are software programs that can implement one or more specific functions. Generally, a plurality of applications, for example, an instant messaging application, a video application, an audio application, and an image capture application, may be installed in an electronic device. The instant messaging application may include, for example, a messaging application, WeChat (WeChat), WhatsApp Messenger, LINE (Line), photo sharing (instagram), Kakao Talk, and DingTalk. The image capture application may include, for example, a camera application (a system camera or a third-party camera application). The video application may include, for example, YouTube, Twitter, TikTok, iQIYI, and Tencent Video. The audio application may include, for example, KuGou, XiaMi Music, and QQ Music. The application in the following embodiments may be an application installed before the electronic device is delivered, or may be an application downloaded from a network or obtained from another electronic device by a user in a process of using the electronic device.

Figure 2:
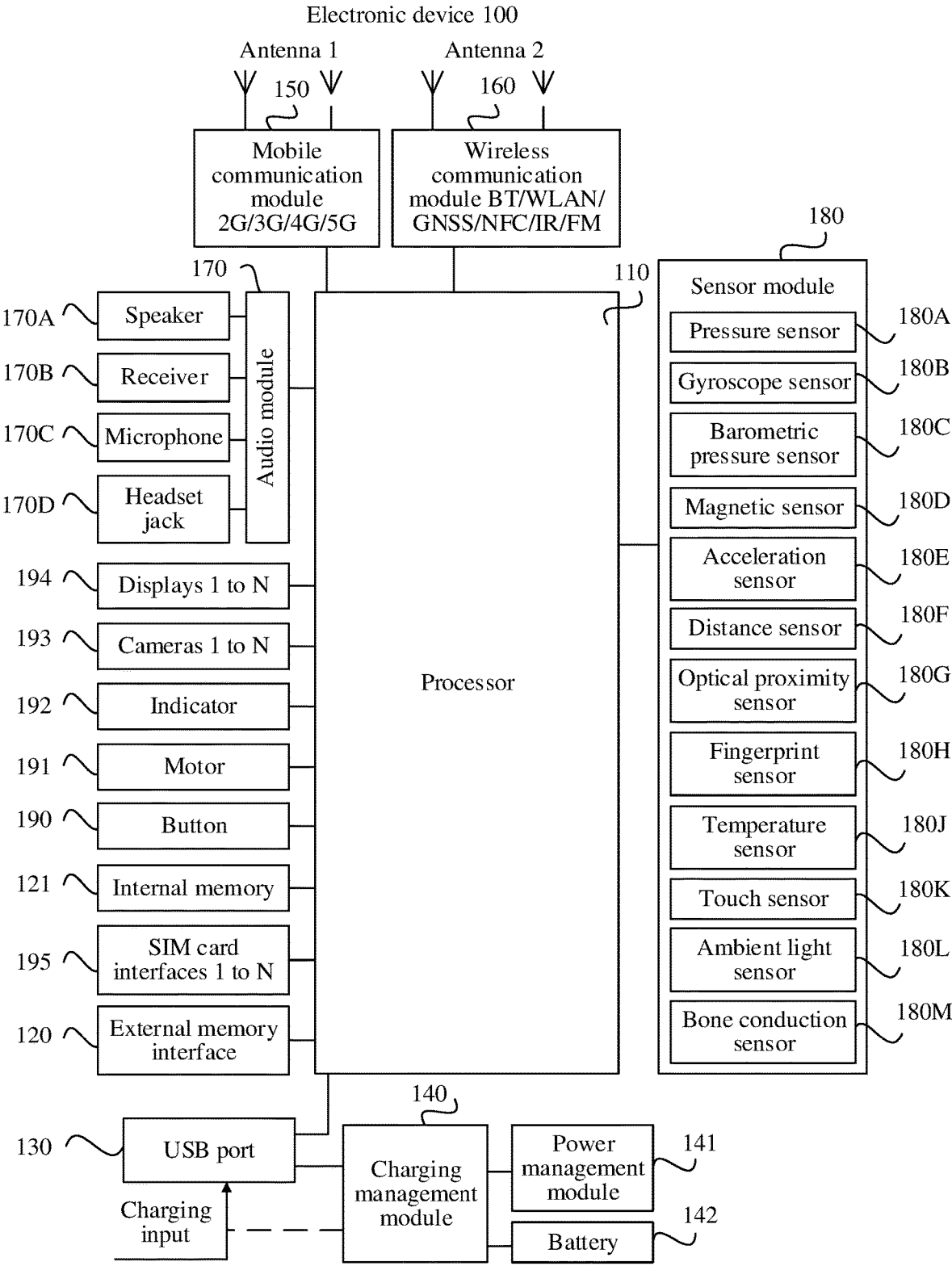
FIG. 2 is a schematic diagram of a hardware structure of an electronic device according to an embodiment of this application.

FIG. 2 is a schematic diagram of a structure of an electronic device according to an embodiment of this application. As shown in FIG. 2, the electronic device may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. The controller may be a nerve center and a command center of the electronic device 100. The controller may generate an operation control signal based on instruction operation code and a time sequence signal, to complete control of instruction reading and instruction execution. A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces a waiting time of the processor 110, and improves system efficiency.

The USB port 130 is an interface that conforms to a USB standard specification, and may be specifically a mini USB port, a micro USB port, a USB type-C port, or the like. The USB port 130 may be configured to be connected to a charger to charge the electronic device 100, or may be configured to transmit data between the electronic device 100 and a peripheral device. The charging management module 140 is configured to receive a charging input from a charger. The power management module 141 is configured to be connected to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communication module 160, and the like.

A wireless communication function of the electronic device 100 may be implemented by using the antenna 1, the antenna 2, the mobile communication module 150, the wireless communication module 160, the modem processor, the baseband processor, and the like. The antenna 1 and the antenna 2 are configured to transmit and receive an electromagnetic wave signal. Each antenna in the electronic device 100 may be configured to cover one or more communication bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same device as at least some modules in the processor 110.

The wireless communication module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), infrared (infrared, IR), or the like and that is applied to the electronic device 100. The wireless communication module 160 may be one or more devices into which at least one communication processing module is integrated. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The display 194 is configured to display a display interface of an application, for example, a viewfinder interface of a camera application. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini LED, a micro LED, a micro OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented by using the NPU, for example, image recognition, facial recognition, speech recognition, and text understanding.

The internal memory 121 may be configured to store computer-executable program code. The executable program code includes instructions. The processor 110 runs the instructions stored in the internal memory 121, to perform various functional applications and data processing of the electronic device 100. The internal memory 121 may include a program storage area and a data storage area. The program storage area may store an operating system, software code of at least one application (for example, iQIYI or WeChat), and the like. The data storage area may store data (for example, a captured image or a recorded video) and the like generated when the electronic device 100 is used. In addition, the internal memory 121 may include a high-speed random access memory, or may include a nonvolatile memory, for example, at least one magnetic disk storage device, a flash memory, or a universal flash storage (universal flash storage, UFS).

The external memory interface 120 may be configured to be connected to an external storage card, for example, a micro SD card, to extend a storage capability of the electronic device. The external storage card communicates with the processor 110 through the external memory interface 120, to implement a data storage function. For example, files such as pictures or videos are stored in the external storage card.

The electronic device 100 may implement an audio function, for example, music playing and recording, by using the audio module 170, the speaker 170A, the receiver 170B, the microphone 170C, the headset jack 170D, the application processor, and the like.

The sensor module 180 may include a pressure sensor 180A, a touch sensor 180K, an ambient light sensor 180L, and the like.

The pressure sensor 180A is configured to sense a pressure signal, and may convert the pressure signal into an electrical signal. In some embodiments, the pressure sensor 180A may be disposed on the display 194.

The ambient light sensor 180L is configured to sense ambient light brightness. The electronic device may adaptively adjust brightness of the display 194 based on the sensed ambient light brightness. The ambient light sensor 180L may be further configured to automatically adjust white balance during photographing. The ambient light sensor 180L may further cooperate with an optical proximity sensor 180G to detect whether the electronic device is in a pocket, to avoid an unintentional touch. A fingerprint sensor 180H is configured to collect a fingerprint. The electronic device may use a feature of the collected fingerprint to implement fingerprint-based unlocking, application lock access, fingerprint-based photographing, fingerprint-based call answering, and the like.

The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor 180K. The touch sensor may transmit the detected touch operation to the application processor to determine a type of the touch event. A visual output related to the touch operation may be provided through the display 194. In some other embodiments, the touch sensor 180K may alternatively be disposed on a surface of the electronic device, and is located at a location different from that of the display 194.

The button 190 includes a power button, a volume button, and the like. The button 190 may be a mechanical button, or may be a touch button. The electronic device 100 may receive a button input, and generate a button signal input related to a user setting and function control of the electronic device 100. The motor 191 may generate a vibration prompt. The motor 191 may be configured to provide an incoming call vibration prompt and touch vibration feedback. For example, touch operations performed on different applications (for example, photographing and audio play) may correspond to different vibration feedback effects. A touch vibration feedback effect may be further customized. The indicator 192 may be an indicator light, and may be configured to indicate a charging status and a power change, or may be configured to indicate a message, a missed call, a notification, and the like. The SIM card interface 195 is configured to be connected to a SIM card. The SIM card may be inserted into the SIM card interface 195 or removed from the SIM card interface 195, to come into contact with and be separated from the electronic device 100.

It may be understood that the components shown in FIG. 2 do not constitute a specific limitation on the mobile phone. The mobile phone may include more or fewer components than those shown in the figure, some components may be combined, some components may be split, or different component arrangements may be used. In the following embodiments, the electronic device shown in FIG. 2 is used as an example for description.

Figure 3:
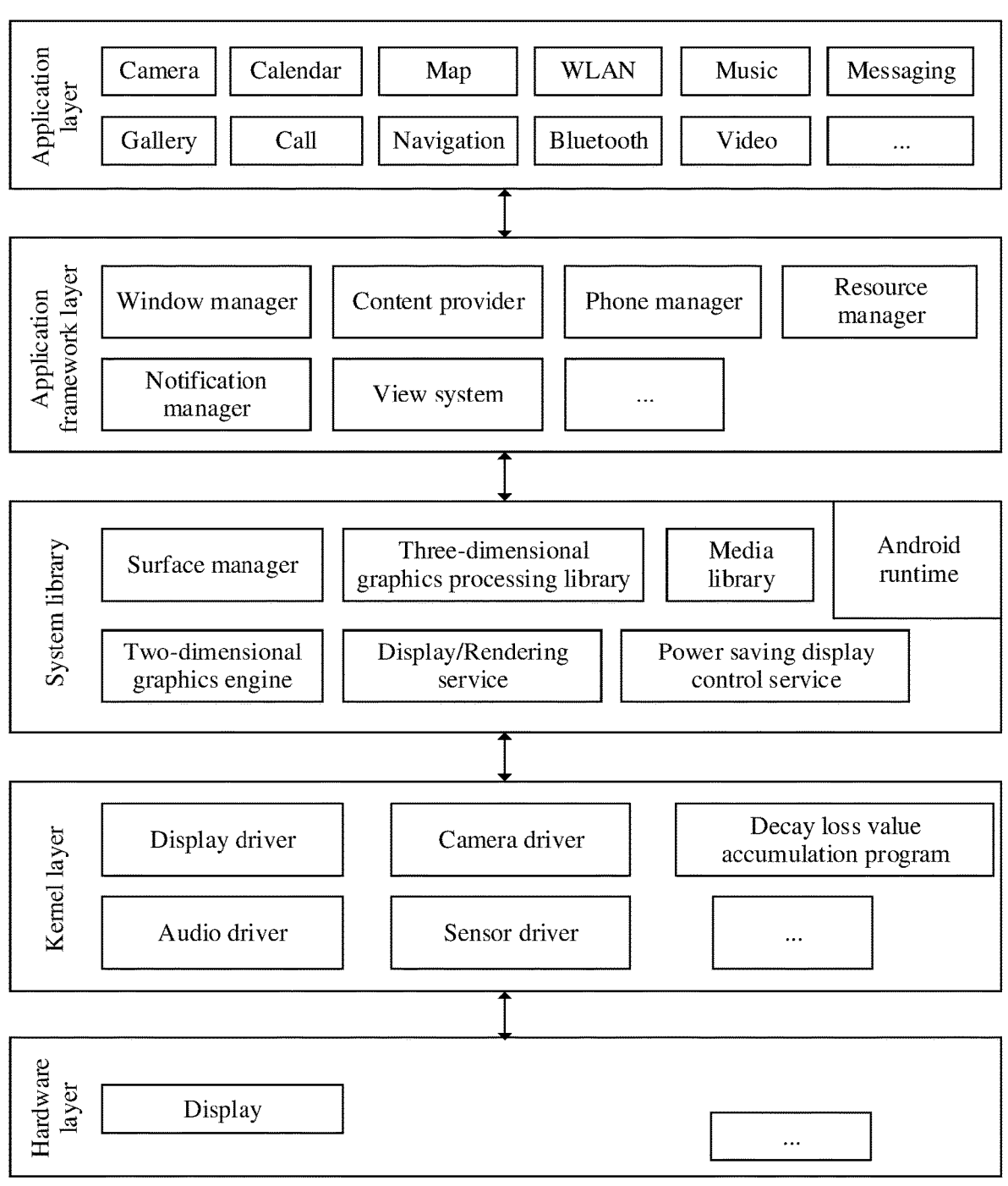
FIG. 3 is a schematic diagram of a software structure of an electronic device according to an embodiment of this application.

FIG. 3 is a block diagram of a software structure of an electronic device according to an embodiment of this application. As shown in FIG. 3, the software structure of the electronic device may be a layered architecture. For example, software may be divided into several layers, and each layer has a clear role and task. The layers communicate with each other through a software interface. In some embodiments, an Android system is divided into four layers:

an application layer, an application framework (framework, FWK) layer, an Android runtime (Android runtime) and system library, and a kernel layer from top to bottom.

The application layer may include a series of application packages. As shown in FIG. 3, the application layer may include Camera, Settings, a skin module, a user interface (user interface, UI), a third-party application, and the like. The third-party application may include WeChat, QQ, Gallery, Calendar, Call, Map, Navigation, WLAN, Bluetooth, Music, Video, Messaging, a voice assistant function, and the like.

The application framework layer provides an application programming interface (application programming interface, API) and a programming framework for an application at the application layer. The application framework layer may include some predefined functions. As shown in FIG. 3, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like. The content provider is configured to: store and obtain data, and enable the data to be accessed by an application. The data may include a video, an image, audio, calls that are made and answered, a browsing history and bookmarks, an address book, and the like.

The view system includes visual controls such as a control for displaying text and a control for displaying a picture. The view system may be configured to construct an application. A display interface may include one or more views. For example, a display interface including an SMS message notification icon may include a text display view and a picture display view.

The phone manager is configured to provide a communication function for the electronic device 100, for example, management of a call status (including answering, declining, or the like).

The resource manager provides various resources such as a localized character string, an icon, a picture, a layout file, and a video file for an application.

The notification manager enables an application to display notification information in a status bar, and may be configured to convey a notification message that may automatically disappear after a short pause without requiring user interaction. For example, the notification manager is configured to: notify download completion, provide a message notification, and the like. The notification manager may alternatively be a notification that appears in the status bar at the top of the system in a form of a chart or scroll bar text, for example, a notification for an application running in background, or a notification that appear on a screen in a form of a dialog window. For example, text information is displayed in the status bar, an alert tone is made, the electronic device vibrates, and the indicator light flashes.

The Android runtime includes a kernel library and a virtual machine. The Android runtime is responsible for scheduling and management of the Android system.

The kernel library includes two parts: a function that needs to be invoked in a Java language and a kernel library of Android. The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (media libraries), a three-dimensional graphics processing library (for example, OpenGL ES), and a 2D graphics engine (for example, SGL).

The surface manager is configured to: manage a display subsystem, and provide fusion of 2D and 3D layers for a plurality of applications.

The media library supports playback and recording in a plurality of commonly used audio and video formats, and static image files. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

In addition, the system library may further include a voice assistant service. The voice assistant service may be configured to: recognize voice data entered by a user, recognize a keyword included in the voice data, and control the electronic device to perform a related operation. For example, the electronic device may obtain a user voice transmitted by using the receiver 170B or the microphone 170C shown in FIG. 2, and recognize the user voice. If the user voice is "play a movie", the electronic device may recognize that keywords are "play" and "movie", and the electronic device may start an application that can play a movie, and play a movie; or the electronic device may play a stored movie.

The kernel layer is a layer between hardware and software. The kernel layer includes at least a display driver, a camera driver, an audio driver, and a sensor driver.

The hardware layer may include various types of sensors, for example, an acceleration sensor, a gyroscope sensor, and a touch sensor in this embodiment of this application.

With reference to the electronic device control method in embodiments of this application, working procedures of software and hardware of the electronic device are described below by using an example.

In embodiments of this application, each user of a voice assistant service may have a user identifier. The user identifier may be an identifier that uniquely identifies the user, for example, may be a phone number or a Huawei account of the user. The user may log in to the user identifier on the electronic device by using the user identifier and a preset password. The user identifier herein may identify an identity of the user. Each user identifier may be associated with an identifier of at least one electronic device. For example, a user may log in to a user identifier on a plurality of electronic devices such as a mobile phone, a tablet computer, and a notebook computer. Therefore, an identifier of an electronic device associated with the user identifier of the user may include an identifier of the mobile phone, an identifier of the tablet computer, and an identifier of the notebook computer. The user may set the identifier of the electronic device associated with the user identifier, or a voice assistant of the user may determine an electronic device on which the user identifier is to be logged in to, so that the electronic device on which the user identifier is to be logged in to may be associated with the user identifier.

The user may have several devices, and a public device (for example, a large screen at home) may be owned by several users. The user identifier may be an identifier of a voice assistant used by the user. In a possible networking manner, voice assistants of different users form a group. When a user A sends an instruction to a user B, the user A transmits information to a voice assistant of the user B by using a voice assistant on a device of the user A, and the voice assistant of the user B executes the instruction. The transmitted information includes a notification that is set, a reminder that is set, and the like.

In a possible implementation, information about the group may include device information of the user. When sending an instruction, the user A may directly query an identifier of another device in a network by using the voice assistant of the user A, and directly send the instruction to a device of the user B instead of the voice assistant of the user B.

In addition, if the two users do not form a group, the voice assistant of the user A may search for the user B by using an address book/application (for example, an instant messaging application such as WeChat or QQ), and send a control message to the device of the user B, so that the device of the user B executes the corresponding instruction.

When the electronic device of the user A sends an instruction to the electronic device of the user B or the voice assistant of the user B, a prompt may be first popped up to the user B, and after the user B agrees, the device of the user B or the voice assistant of the user B executes the related instruction.

In a possible implementation, different users may communicate with each other by using user identifiers. For example, the user A wants to send a reminder message to the user B to remind the user B to keep an appointment at 8:00. In this case, the user A may enter an instruction "remind the user B to keep an appointment at 8:00" on the electronic device A. The electronic device A may search the address book for the user B, for example, may search the address book for a phone number named "user B". If the electronic device A finds, in the address book, the phone number named "user B", the electronic device A may send an SMS message "please keep an appointment at 8:00" to the phone number. Alternatively, the electronic device A may search for the voice assistant of the user B based on the phone number of the user B, and send the entered instruction "remind the user B to keep an appointment at 8:00" or a reminder message generated based on the instruction to the voice assistant of the user B. The voice assistant of the user B may send the instruction or the reminder message to an electronic device associated with a user identifier of the user B. The electronic device of the user B may display the reminder message, or may generate a schedule for reminding at 8:00. Optionally, before generating the schedule for reminding at 8:00, the electronic device of the user B may ask for consent of the user B, for example, may display information "the user A reminds you to keep an appointment at 8:00, and whether to generate a schedule for reminding at 8:00" on a display, and after the user B agrees, the electronic device of the user B may generate the schedule for reminding at 8:00.

The user may wake up the voice assistant service by entering voice data. In an example, the user may wake up the voice assistant service by entering voice data that includes specified text content. The specified text content may be voice data used when the user registers voice data used to wake up the voice assistant service. After receiving the voice data entered by the user, the electronic device may perform text recognition on the voice data to determine whether the specified text content exists. If the specified text content exists in the voice data, the electronic device enters the voice assistant service. In another example, the user may wake up the voice assistant service by entering random voice data or voice data that includes specified text content. The electronic device may obtain a voiceprint feature of the user based on the voice data entered by the user. The electronic device may compare the obtained voiceprint feature with a stored voiceprint feature. When a comparison result indicates that matching succeeds, the electronic device may enter the voice assistant service.

The user may turn on a display by touching the display, by touching a physical button on the electronic device, or by using a preset mid-air gesture. A manner of touching the display may include, for example, tapping the display, double tapping the display, or drawing a preset pattern on the display, for example, a letter. The pattern herein may be preset, or may be specified by the electronic device. This is not specifically limited in this application. The preset mid-air gesture may include, for example, sliding to the right by a palm, sliding to the left by a palm, sliding to the right by a finger, or sliding to the left by a finger. The mid-air gesture may be preset by the user, or may be specified by the electronic device. This is not specifically limited in this application. After the display is turned on, the user may enter preset voice data, for example, the user may say "hello". The electronic device may receive the voice data that is entered by the user and that includes content "hello", and recognize that the voice data includes a wakeup word. Therefore, the electronic device enters the voice assistant service. After entering the voice assistant service, the electronic device may turn on a screen, and display prompt information on the display, to prompt the user with information indicating that the voice assistant service is entered. For example, the electronic device may display content such as "I am here" or "what can I do for you" on the display, to prompt the user to continue to enter an instruction. Optionally, the electronic device may not turn on a screen, that is, keep the screen in an off state, and prompt, by outputting voice data, the user with information indicating that the voice assistant service is entered. The electronic device may output voice data that includes content "I am here" or "what can I do for you", to prompt the user with information indicating that the voice assistant service is entered.

It should be understood that the specified text content for waking up the voice assistant service may be recorded by the user in advance on the electronic device, or may be specified by the electronic device. In an example, if the user wants to wake up the voice assistant service by entering voice data, the user may register a voiceprint on the electronic device in advance. The electronic device may prompt the user with information "please say "hello"" on the display, and the user may say "hello" based on the prompt. The electronic device may perform voiceprint recognition based on the voice data entered by the user, to obtain the voiceprint feature of the user, and store the voiceprint feature of the user. Optionally, to improve accuracy of voiceprint recognition, the electronic device may further continue to prompt the user to enter voice data. The electronic device may display "please say "play music"" on the display, and the user may say "play music" based on the prompt. After the registration is completed, the electronic device may display a registration completion prompt on the display. The user may enter voice data for a plurality of times based on a prompt of the electronic device, so that the electronic device can recognize the voiceprint feature of the user based on the voice data entered by the user for the plurality of times.

When the user wakes up the voice assistant service by entering voice data, the electronic device may receive the voice data entered by the user, and perform voiceprint recognition on the voice data, to obtain the voiceprint feature of the voice data. The electronic device may compare the obtained voiceprint feature with the stored voiceprint feature, to determine whether a same person is indicated. If a same person is indicated, the voice assistant service may be woken up. If different persons are indicated, the voice assistant service cannot be woken up. Optionally, if different persons are indicated, the electronic device may prompt, on the display, the user with information indicating that the voice assistant service is not woken up, or may prompt the user to re-enter voice data.

In a possible implementation, a plurality of users may form a group by using respective user identifiers. A user 1 may first create a group, and may invite a user that the user 1 wants to invite to join the created group. The plurality of users may create a group by joining a private group. The plurality of users may enter a same number, text, or the like on electronic devices by using a function of joining a private group. The electronic device may send the user identifier and the number or text entered by the user to a server of the voice assistant service. The server of the voice assistant service may search for user identifiers that enter the same number or text at a same time and at a same location, and create a group for these user identifiers. The server of the voice assistant service may notify an electronic device corresponding to each user identifier, and the electronic device may display the created group. The user may add a new member to the created group. For example, a member in the group may invite a new member to join the group. In addition, a group owner that creates the group may remove any group member from the group.

Figure 4A:
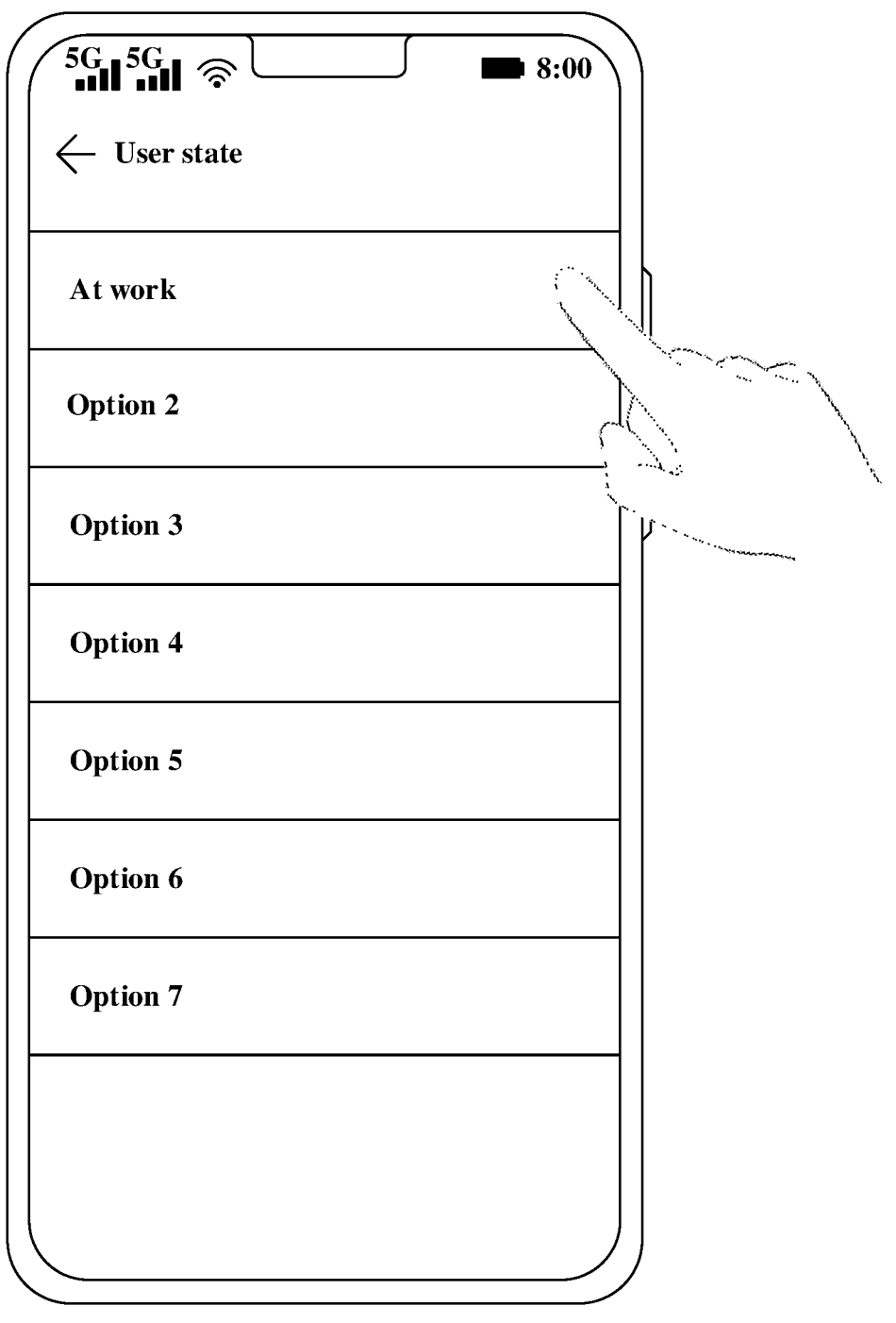
FIG. 4A is a schematic diagram of a display interface for setting a user state according to an embodiment of this application.

After creating the group by using the user identifier in the foregoing manner, the user may share some information, for example, location information and a user state, in the group. For example, in a group, a group member may share a thing that the group member is currently doing, or may share a thing that the group member does at a specific time. Referring to FIG. 4A, the user A may adjust a user state to "at work" in a group, and other members, for example, the user B and a user C, in the group may learn that the user A is working. Optionally, the user A may set the user state to "Do Not Disturb" in the group, and other members, for example, the user B and the user C, in the group may learn that the user A does not want to be disturbed.

In a possible implementation, the voice assistant service on the electronic device may collect information that is set by the user, for example, may collect schedule information that is set by the user or alarm clock information that is set by the user, to adjust the user state. For example, the user sets schedule information of starting to do homework at 5 p.m. In this case, after obtaining the schedule information, the electronic device may adjust the user state to "doing homework" when 5 p.m. arrives. Optionally, the voice assistant service on the electronic device may further collect status information of the user by using a sensor of the electronic device, for example, may collect the status information of the user by using a camera, an audio module, a touch sensor, and a pressure sensor of the electronic device.

For example, the electronic device may collect, by using the camera, what the user is currently doing, for example, the user is working, doing homework, or sleeping. Alternatively, the electronic device may collect voice data of the user by using the audio module, and perform text recognition on the voice data, to determine the user state. The electronic device may further collect, by using the touch sensor and the pressure sensor, whether the user is using the electronic device.

Figure 4B:
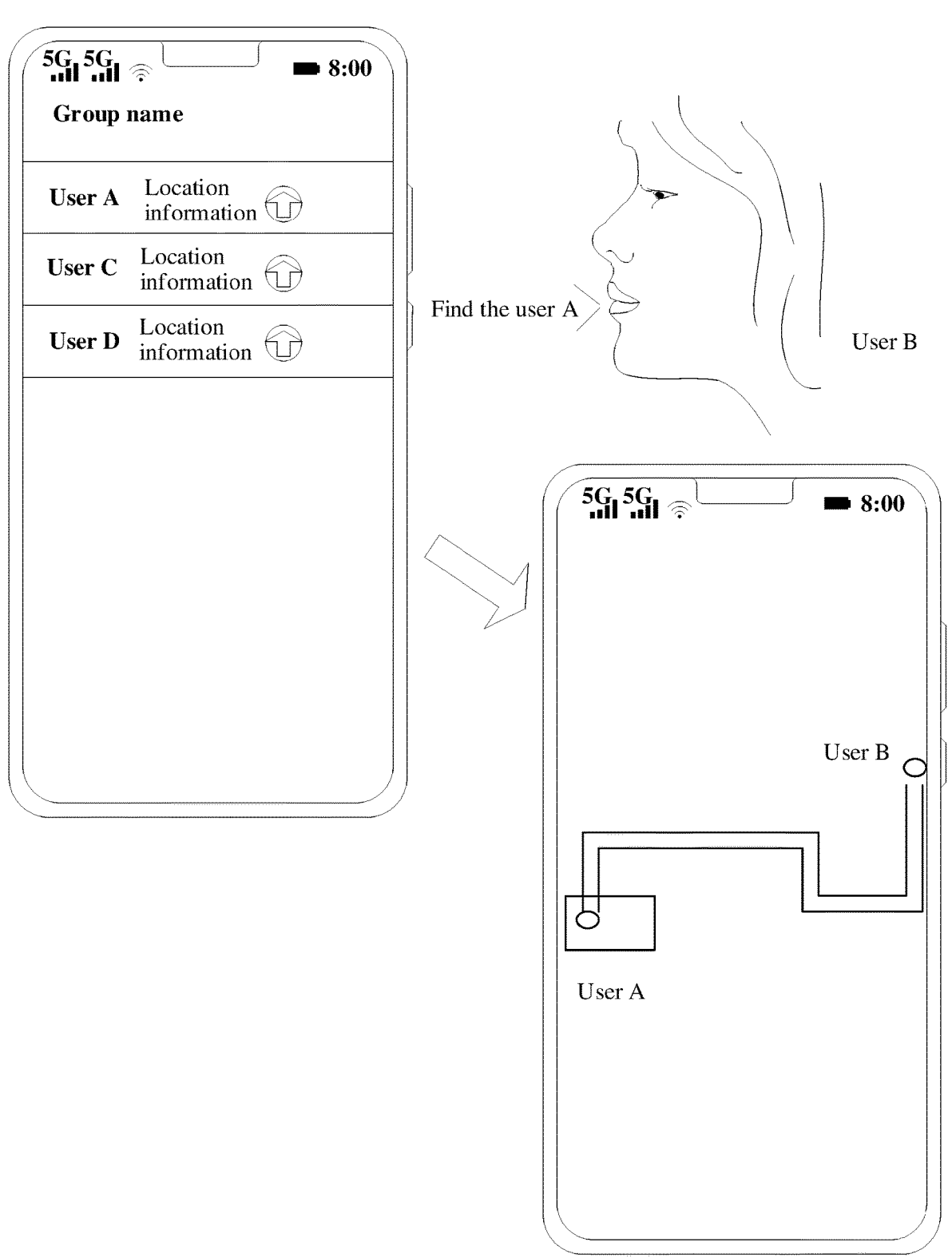
FIG. 4B is a schematic diagram of a display interface for sharing location information by a user according to an embodiment of this application.

In the group, a group member may share location information of the group member. Referring to FIG. 4B, the user A may share location information of the user A in the group, and the user B and the user C in the group may determine a current location of the user A and distances between the current location of the user A and locations of the user B and the user C by using the location information shared by the user A. In addition, if the user B wants to know how to reach the location of the user A, a navigation function may be entered by using a shortcut key or a voice instruction. For example, if the user B wants to know how to reach the location of the user A, the user B may say "find the user A", and the electronic device of the user B may receive the voice data and perform text recognition. The electronic device of the user B may enter the navigation function based on a recognized voice instruction, to search for a manner of reaching the location of the user A from the location of the user B.

In the group, group members may share information such as a photo, a video, or a file with each other. Each group may have a shared folder. A group member may store a photo, a video, a file, or the like that the group member wants to share in the shared folder, and any group member in the group may view the shared photo, video, file, or the like in the shared folder. In addition, one or some group members may be reminded to view the shared folder. With reference to the accompanying drawings, a method for setting a reminder message for one or some group members by a group member in a group in an embodiment of this application is described below.

Figure 5:
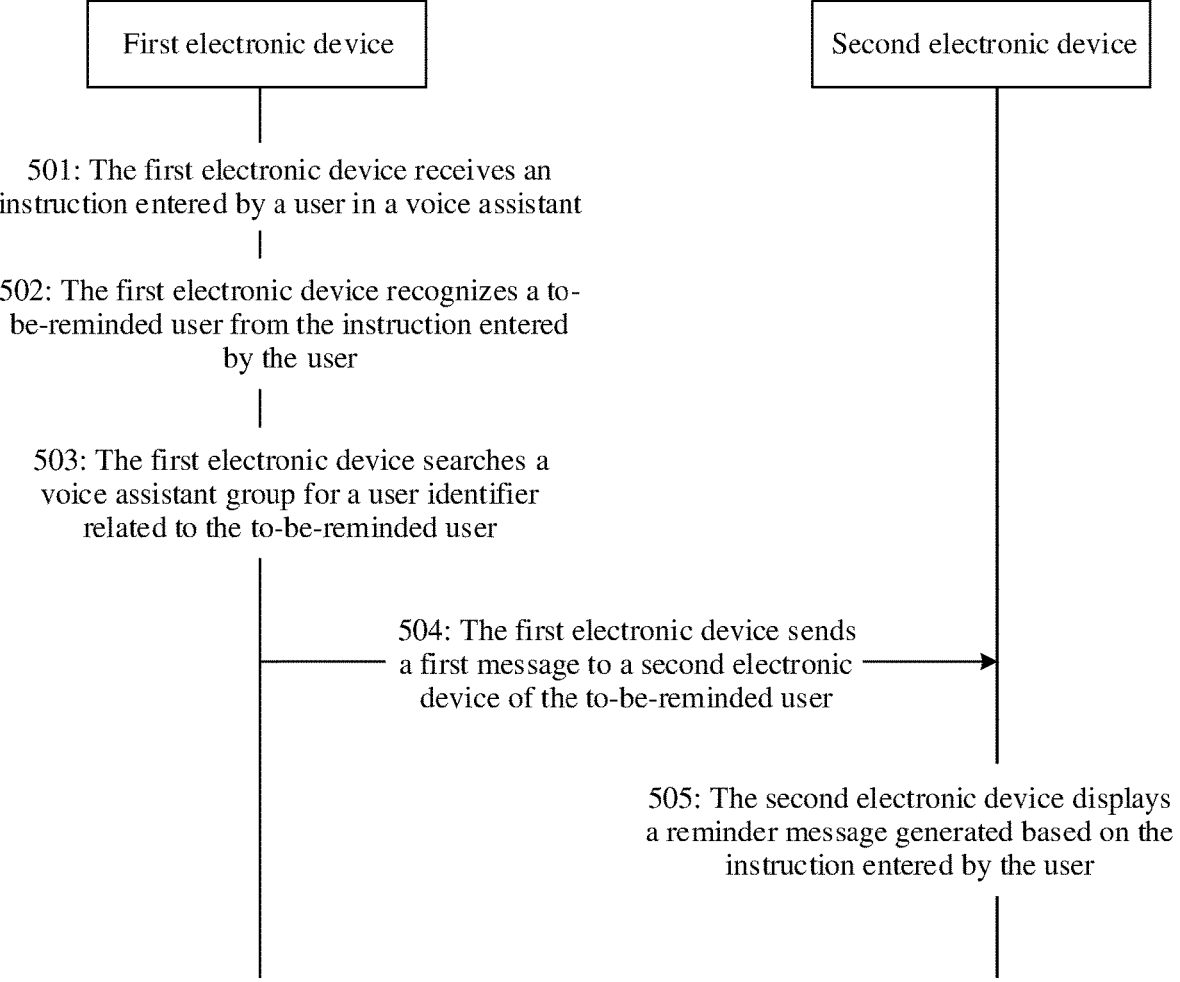
FIG. 5 is an example flowchart of an electronic device control method according to an embodiment of this application.

FIG. 5 is an example flowchart of an electronic device control method according to an embodiment of this application. The method may include the following steps.

501: A first electronic device receives an instruction entered by a user in a voice assistant.

The first electronic device may receive a voice instruction entered by the user in the voice assistant, or a manually entered instruction. The first electronic device may receive, by using an audio module, the voice instruction entered by the user.

502: The first electronic device recognizes a to-be-reminded user from the instruction entered by the user.

The first electronic device may perform text recognition on the instruction entered by the user, and recognize the user from the instruction. For example, the instruction entered by the user is "remind A to view a group message", and the first electronic device may perform text recognition on the instruction, and may recognize that A needs to be reminded. Therefore, the first electronic device may determine that the to-be-reminded user is A.

503: The first electronic device searches a voice assistant group for a user identifier related to the to-be-reminded user.

It should be understood that to-be-reminded user herein may be a remark name set by the user of the first electronic device for the user, or may be a nickname set by the user. For example, the instruction entered by the user is "remind the mother to watch a television", and the first electronic device may recognize that the to-be-reminded user is the "mother". The first electronic device may search the voice assistant group for a remark name and a nickname, and determine a user identifier of the "mother".

504: The first electronic device sends a first message to a second electronic device of the to-be-reminded user.

The first message herein may be the instruction received by the first electronic device, or may be a reminder message generated by the first electronic device based on the instruction entered by the user. For example, the first electronic device receives the instruction "remind the mother to watch a television", and the first electronic device may send the instruction "remind the mother to watch a television" to the second electronic device. Alternatively, the first electronic device may generate a reminder message, for example, "watch a television", based on the instruction, and the first electronic device may send the reminder message to the second electronic device.

In an example, the first electronic device may send the first message to a voice assistant of the to-be-reminded user by using the voice assistant. For example, the first electronic device determines that the to-be-reminded user is the "user A". Therefore, the voice assistant on the first electronic device may send the first message to a voice assistant of the user A.

In another example, the first electronic device may send, by using the voice assistant, the first message to some or all of electronic devices associated with the user identifier of the to-be-reminded user. For example, the first electronic device may determine a usage status of the electronic device associated with the user identifier of the to-be-reminded user, and the first electronic device may send, by using the voice assistant, the instruction or the reminder message to an electronic device that is being used in the electronic devices associated with the user identifier of the to-be-reminded user. The first electronic device may send, by using the voice assistant, a request message for obtaining whether the user is using the electronic device to the electronic device associated with the user identifier of the to-be-reminded user. The electronic device associated with the user identifier of the to-be-reminded user may determine, based on a sensor, a camera, and/or an audio module, whether the user is using the electronic device, and send an obtained result to the first electronic device.

It should be noted that the electronic device may determine, based on a pressure sensor or a touch sensor, whether the user is using the target device. Alternatively, the electronic device may determine, by using the camera, whether the user is using the electronic device. For example, the electronic device may turn on the camera, and when recognizing a face by using the camera, may determine that the user is using the electronic device. Alternatively, the electronic device may determine, by using the audio module, whether the user is using the electronic device. For example, the electronic device may turn on the audio module to determine whether there is a user who is speaking, and if there is a user who is speaking, may consider that the user is using the electronic device.

505: The second electronic device displays a reminder message generated based on the instruction entered by the user.

After receiving the instruction entered by the user, the voice assistant on the second electronic device may send the instruction to the second electronic device, and the second electronic device may generate the corresponding reminder message based on the instruction. Alternatively, after receiving the instruction entered by the user, the voice assistant on the second electronic device may generate the corresponding reminder message based on the instruction, and send the reminder message to the second electronic device.

Figure 6:
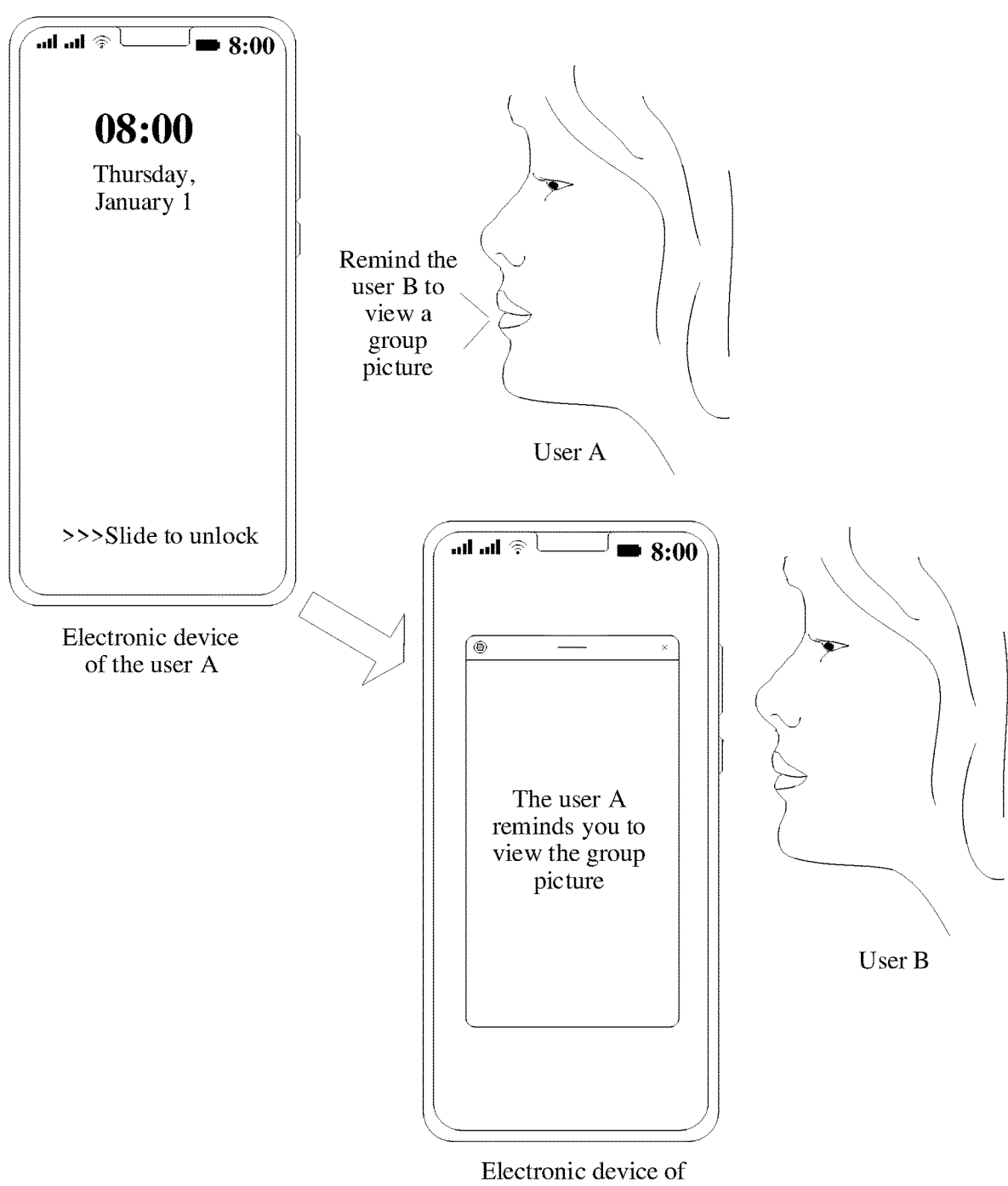
FIG. 6 is a schematic functional diagram of a voice assistant group according to an embodiment of this application.

For example, the user A uploads a picture to a shared folder, and wants to remind a user B to view the picture. Therefore, the user A may enter an instruction in the voice assistant of the user A manually or by entering a voice instruction. The voice assistant of the user A may parse the instruction, and generate a corresponding reminder message. The voice assistant of the user A may search a voice assistant group for the user B, and the voice assistant of the user A may send the reminder message to a voice assistant of the user B. The voice assistant of the user B sends the reminder message to an electronic device of the user B, and the electronic device of the user B may display the reminder message on a display, as shown in FIG. 6. The voice assistant of the user B may send the reminder message to all or some of electronic devices associated with a user identifier of the user B. For example, the voice assistant of the user B may obtain a current usage status of the electronic device associated with the user identifier of the user B, and the voice assistant of the user B may send the reminder message to an electronic device that is being used. Optionally, the voice assistant of the user A may send the instruction entered by the user A to the voice assistant of the user B, and the voice assistant of the user B parses the instruction, and generates a corresponding reminder message.

It should be noted that when the user A, for example, the "daughter", sets a reminder for the user B, for example, the "mother", the electronic device A may send first information or an instruction to the electronic device B in real time, and the electronic device B may set a reminder message on the electronic device B based on the instruction or the first information. The first information herein may include event information and a time point. Alternatively, the electronic device A may store the instruction or the first information in the electronic device A, and send the instruction or the first information to the electronic device B when the time point arrives, so that the electronic device B performs reminding based on the time point and the event information. The instruction may include setting a reminder, invoking an application, controlling a peripheral device, and the like.

In an example, the user A may say "play a birthday song for the user B at 00:00 on May 1" to a voice assistant on an electronic device 1. In this case, the voice assistant of the user A may directly send a message to the voice assistant of the user B or to an electronic device 2 associated with the user identifier of the user B. The electronic device 2 may set a reminder message, and open, at 00:00 on May 1, an application that can play music to play a birthday song.

In another example, the voice assistant of the user A may store an instruction "play a birthday song for the user B at 00:00 on May 1" in an electronic device 1, and when 00:00 on May 1 arrives, send the instruction to the voice assistant of the user B or to an electronic device 2 associated with the user identifier of the user B. The electronic device 2 may open, based on the instruction, an application that can play music to play a birthday song. Optionally, the electronic device 1 may send the instruction to the voice assistant of the user B or to the electronic device 2 associated with the user identifier of the user B in advance. For example, the electronic device 1 may send the instruction to the voice assistant of the user B or to the electronic device 2 associated with the user identifier of the user B at 23:58 on April 30. When 00:00 on May 1 arrives, the electronic device 1 opens the application that can play music to play a birthday song.

In addition, if the voice assistant of the user A determines, at the time point, that the user A and the user B are located in a same area, a proper device in space is selected to play a birthday song. For example, a public play device may be selected to play a birthday song.

In a possible implementation, the user A may say "adjust a temperature of an air conditioner of B to 22 degrees or adjust a temperature of an air conditioner of the user B to a high temperature when the user sleeps at night" to a voice assistant on an electronic device 1. In this case, the voice assistant of the user A may directly send a message to the voice assistant of the user B or to an electronic device 2 associated with the user identifier of the user B. When a preset time point arrives or it is detected that the user B enters a rest state, the electronic device 2 controls the air conditioner, and adjusts the temperature of the air conditioner to 22 degrees, or may control the temperature of the air conditioner to be within a specified range of a relatively high temperature.

In another example, the voice assistant of the user A may store an instruction "adjust a temperature of an air conditioner of B to 22 degrees or adjust a temperature of an air conditioner of the user B to a high temperature when the user sleeps at night" in an electronic device 1. When a preset time point arrives, the electronic device 1 may send the instruction to the voice assistant of the user B or to an electronic device 2 associated with the user identifier of the user B. The electronic device 2 may control the air conditioner, and adjust the temperature of the air conditioner to 22 degrees, or may control the temperature of the air conditioner to be within a specified range of a relatively high temperature. Optionally, the electronic device 1 may send the instruction to the voice assistant of the user B or to the electronic device 2 associated with the user identifier of the user B before the preset time point arrives.

In addition, if the voice assistant of the user A determines, at the preset time point, that the user A and the user B are located in a same area, a proper device in the area may be selected to adjust the temperature of the air conditioner. For example, a device of the user A, a device of the user B, or another device may be selected.

In another possible implementation, the voice assistant of the user A may search the voice assistant group for the electronic device associated with the user identifier of the user B, and send the entered instruction or the generated reminder message to the found electronic device. Alternatively, the voice assistant of the user A may determine the usage status of the electronic device associated with the user identifier of the user B, and the voice assistant of the user A may send the instruction or the reminder message to the electronic device that is being used in the electronic device associated with the user identifier of the user B. The electronic device A may send, by using the voice assistant, a request message for obtaining whether the user is using the electronic device to the electronic device associated with the user identifier of the user B. The electronic device associated with the user identifier of the user B may determine, based on a sensor, a camera, and/or an audio module, whether the user is using the electronic device, and send an obtained result to an electronic device A.

In the group, a group member may set a reminder message for some or all of other group members. For example, a group member, namely, the user A, may set a reminder message for the user B.

In an example, the user A and the user B are not located in a same area, and the user A may remind the user B "to take medicine". The user A may enter, in the voice assistant of the user A manually or by entering a voice instruction, a related instruction for reminding the user B to take medicine. The voice assistant of the user A may search the voice assistant group for the voice assistant of the user B, and the voice assistant of the user A may send the instruction entered by the user A or a reminder message generated based on the entered instruction to the voice assistant of the user B. The voice assistant of the user A may send the instruction or the reminder message to the voice assistant of the user B by using a mobile communication network or an instant messaging message. The voice assistant of the user B may generate a corresponding reminder message based on the instruction, and send the reminder message to the electronic device of the user B. Alternatively, the voice assistant of the user A may send, by using a mobile data network or an instant messaging message, the instruction or the reminder message to the electronic device associated with the user identifier of the user B. The electronic device of the user B may display the reminder message through ringing, vibration, or voice, and/or the electronic device of the user B may display the reminder message on the display.

In another example, the user A and the user B are located in a same area, and the user A may remind the user B that "there is a conference at 8 a.m.". The user A may enter, in the voice assistant of the user A manually or by entering a voice instruction, a related instruction for reminding the user B that there is a conference at 8:00 a.m. The voice assistant of the user A may search the voice assistant group for the voice assistant of the user B, and the voice assistant of the user A may send the instruction or a reminder message generated based on the instruction to the voice assistant of the user B. The voice assistant of the user A may send the instruction or the reminder message to the voice assistant of the user B by using a wireless local area network, Bluetooth, a mobile communication network, or an instant messaging message. The voice assistant of the user B may send the reminder message to all or some of the electronic devices associated with the user identifier of the user B. Alternatively, the voice assistant of the user A may send the instruction or the reminder message to all or some of the electronic devices associated with the user identifier of the user B. The voice assistant of the user A may send the instruction or the reminder message to the electronic device of the user B by using a wireless local area network, Bluetooth, a mobile communication network, or an instant messaging message. The electronic device of the user B may display the reminder message through ringing, vibration, or voice, and/or the electronic device of the user B may display the reminder message on the display.

In an example, each member in the group may set a corresponding reminder manner for another member on an electronic device. For example, a group member 1 may set a unique ringtone for a group member 2, and the group member 1 may set a unique ringtone for a group member 3. When receiving a reminder message from the group member 2, an electronic device of the group member 1 may display the reminder message from the group member 2 based on the preset ringtone for the group member 2.

Figure 7:
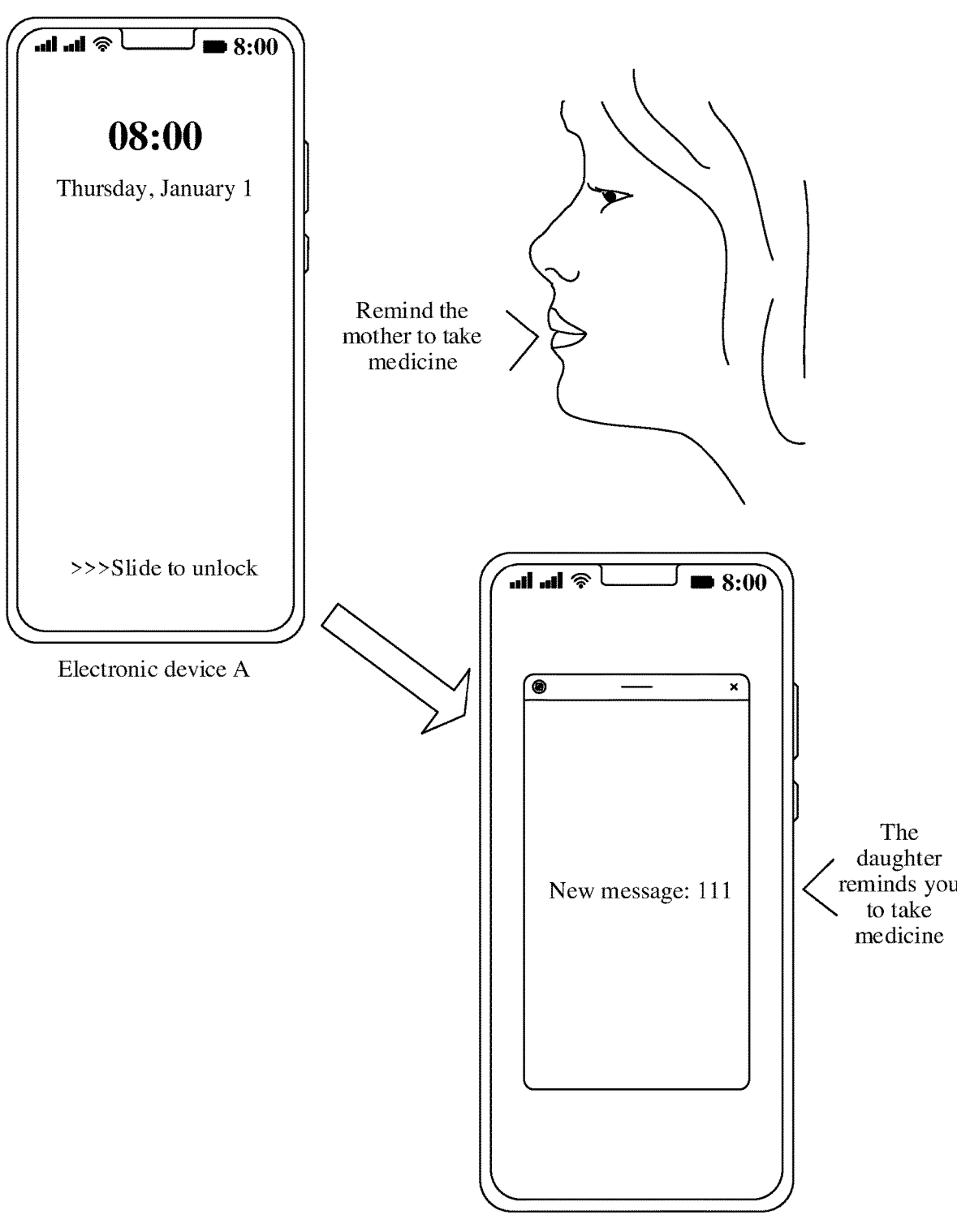
FIG. 7 is a schematic functional diagram of a voice assistant group according to an embodiment of this application.

For example, referring to FIG. 7, in a family group, a daughter wants to remind a mother to take medicine. Therefore, the daughter may say "remind the mother to take medicine" to an electronic device A by entering a voice instruction. The electronic device A may receive the voice instruction by using a microphone or a receiver, and perform text recognition. The electronic device A may recognize, from the voice instruction, a user that needs to be reminded, namely, the "mother". The electronic device A may search a voice assistant group for a user related to the "mother". For example, the electronic device A may search the voice assistant group for a user remarked as "mother". The electronic device A may send, by using a voice assistant, the instruction or a reminder message generated based on the instruction to the found user, namely, a voice assistant of the "mother". The voice assistant of the "mother" may send the instruction or the reminder message to an electronic device B associated with a user identifier of the "mother". Alternatively, the electronic device A may send, by using the voice assistant, the instruction or the generated reminder message to the electronic device B associated with the user identifier of the "mother". The electronic device B may display the reminder message through vibration and a voice prompt "the daughter reminds you to take medicine".

It should be noted that when the user A, for example, the "daughter", sets a reminder for the user B, for example, the "mother", the electronic device A may send first information or an instruction to the electronic device B in real time, and the electronic device B may set a reminder message on the electronic device B based on the instruction or the first information. The first information herein may include event information and a time point. Alternatively, the electronic device A may store the instruction or the first information in the electronic device A, and send the instruction or the first information to the electronic device B when the time point arrives, so that the electronic device B performs reminding based on the time point and the event information. The instruction may include setting a reminder, invoking an application, controlling a peripheral device, and the like.

In an example, the user A may say "play a birthday song for the user B at 00:00 on May 1" to a voice assistant on an electronic device 1. In this case, the voice assistant of the user A may directly send a message to the voice assistant of the user B or to an electronic device 2 associated with the user identifier of the user B. The electronic device 2 may set a reminder message, and open, at 00:00 on May 1, an application that can play music to play a birthday song.

In another example, the voice assistant of the user A may store an instruction "play a birthday song for the user B at 00:00 on May 1" in an electronic device 1, and when 00:00 on May 1 arrives, send the instruction to the voice assistant of the user B or to an electronic device 2 associated with the user identifier of the user B. The electronic device 2 may open, based on the instruction, an application that can play music to play a birthday song. Optionally, the electronic device 1 may send the instruction to the voice assistant of the user B or to the electronic device 2 associated with the user identifier of the user B in advance. For example, the electronic device 1 may send the instruction to the voice assistant of the user B or to the electronic device 2 associated with the user identifier of the user B at 23:58 on April 30. When 00:00 on May 1 arrives, the electronic device 1 opens the application that can play music to play a birthday song.

In addition, if the voice assistant of the user A determines, at the time point, that the user A and the user B are located in a same area, a proper device in space is selected to play a birthday song. For example, a public play device may be selected to play a birthday song.

In a possible implementation, the user A may say "adjust a temperature of an air conditioner of B to 22 degrees or adjust a temperature of an air conditioner of the user B to a high temperature when the user sleeps at night" to a voice assistant on an electronic device 1. In this case, the voice assistant of the user A may directly send a message to the voice assistant of the user B or to an electronic device 2 associated with the user identifier of the user B. When a preset time point arrives or it is detected that the user B enters a rest state, the electronic device 2 controls the air conditioner, and adjusts the temperature of the air conditioner to 22 degrees, or may control the temperature of the air conditioner to be within a specified range of a relatively high temperature.

In another example, the voice assistant of the user A may store an instruction "adjust a temperature of an air conditioner of B to 22 degrees or adjust a temperature of an air conditioner of the user B to a high temperature when the user sleeps at night" in an electronic device 1. When a preset time point arrives, the electronic device 1 may send the instruction to the voice assistant of the user B or to an electronic device 2 associated with the user identifier of the user B. The electronic device 2 may control the air conditioner, and adjust the temperature of the air conditioner to 22 degrees, or may control the temperature of the air conditioner to be within a specified range of a relatively high temperature. Optionally, the electronic device 1 may send the instruction to the voice assistant of the user B or to the electronic device 2 associated with the user identifier of the user B before the preset time point arrives.

In addition, if the voice assistant of the user A determines, at the preset time point, that the user A and the user B are located in a same area, a proper device in the area may be selected to adjust the temperature of the air conditioner. For example, a device of the user A, a device of the user B, or another device may be selected.

Figure 8:
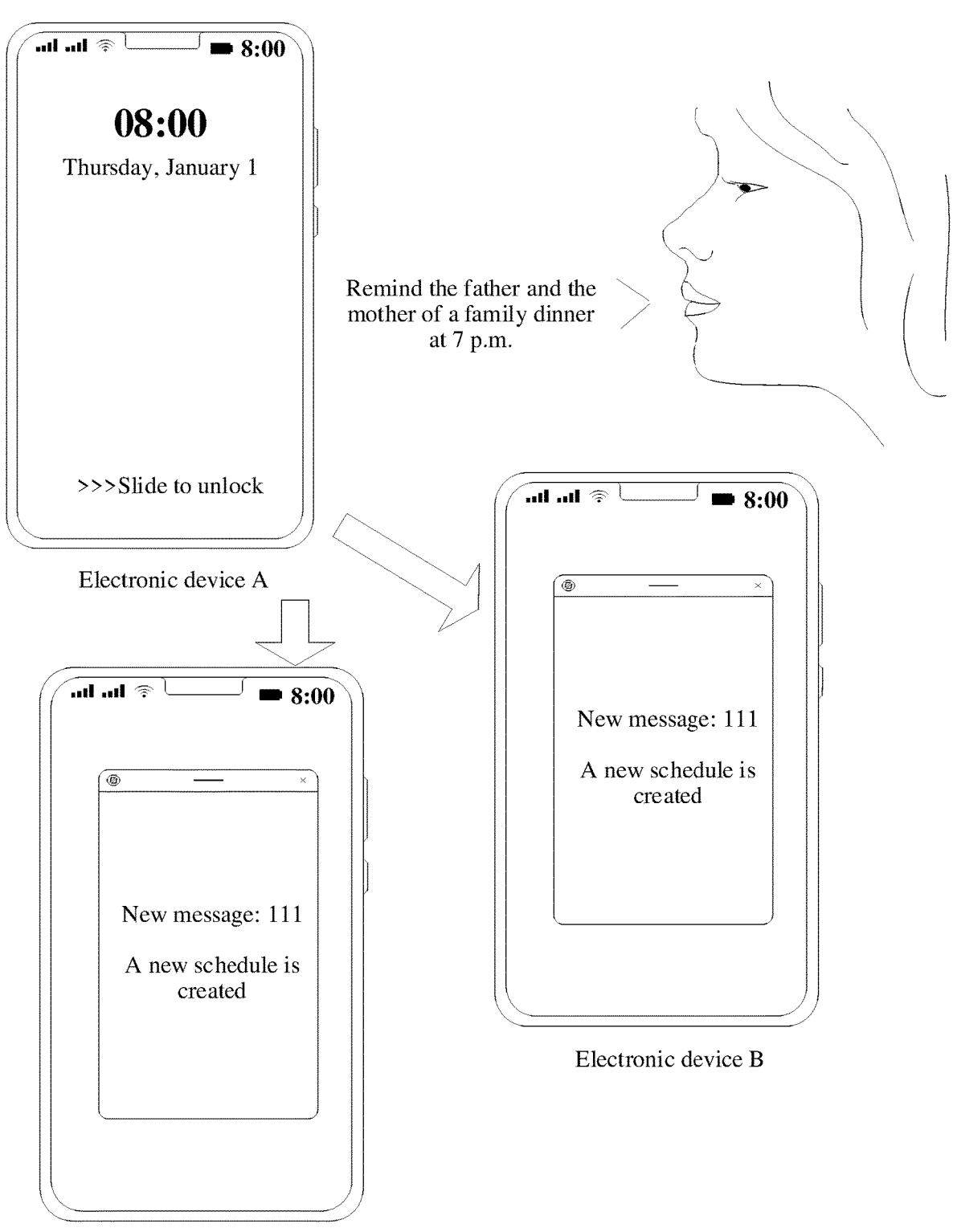
FIG. 8 is a schematic functional diagram of a voice assistant group according to an embodiment of this application.

In a possible implementation, a member in the group may further set a reminder message for another group member through reservation. For example, referring to FIG. 8, in the family group, the daughter wants to remind a father and the mother of a family dinner at 7 p.m. Therefore, the daughter may enter an instruction on the electronic device A manually or by entering a voice instruction. For example, the daughter may say "remind the father and the mother of a family dinner at 7 p.m.". The electronic device A may receive the voice instruction, and perform text recognition. The electronic device A may recognize the voice instruction, and recognize, from the voice instruction, users who need to be reminded, namely, the "mother" and the "father". The electronic device A may separately search the voice assistant group for users related to the "mother" and the "father". The electronic device A may send the voice instruction or a reminder message generated based on the voice instruction to a voice assistant group of the found users. That is, the electronic device A may separately send the voice instruction or the reminder message to voice assistants of the "mother" and the "father". The voice assistant of the "mother" may send the reminder message or the instruction to some or all of electronic devices B associated with the user identifier of the "mother". The voice assistant of the "father" may send the reminder message or the voice instruction to all or some of electronic devices C associated with a user identifier of the "father". The electronic device B and the electronic device C may display the reminder message through ringing. Optionally, when receiving the instruction, each of the electronic device B and the electronic device C may create a schedule, to remind the user of the schedule at 7:00.

Figure 9A:
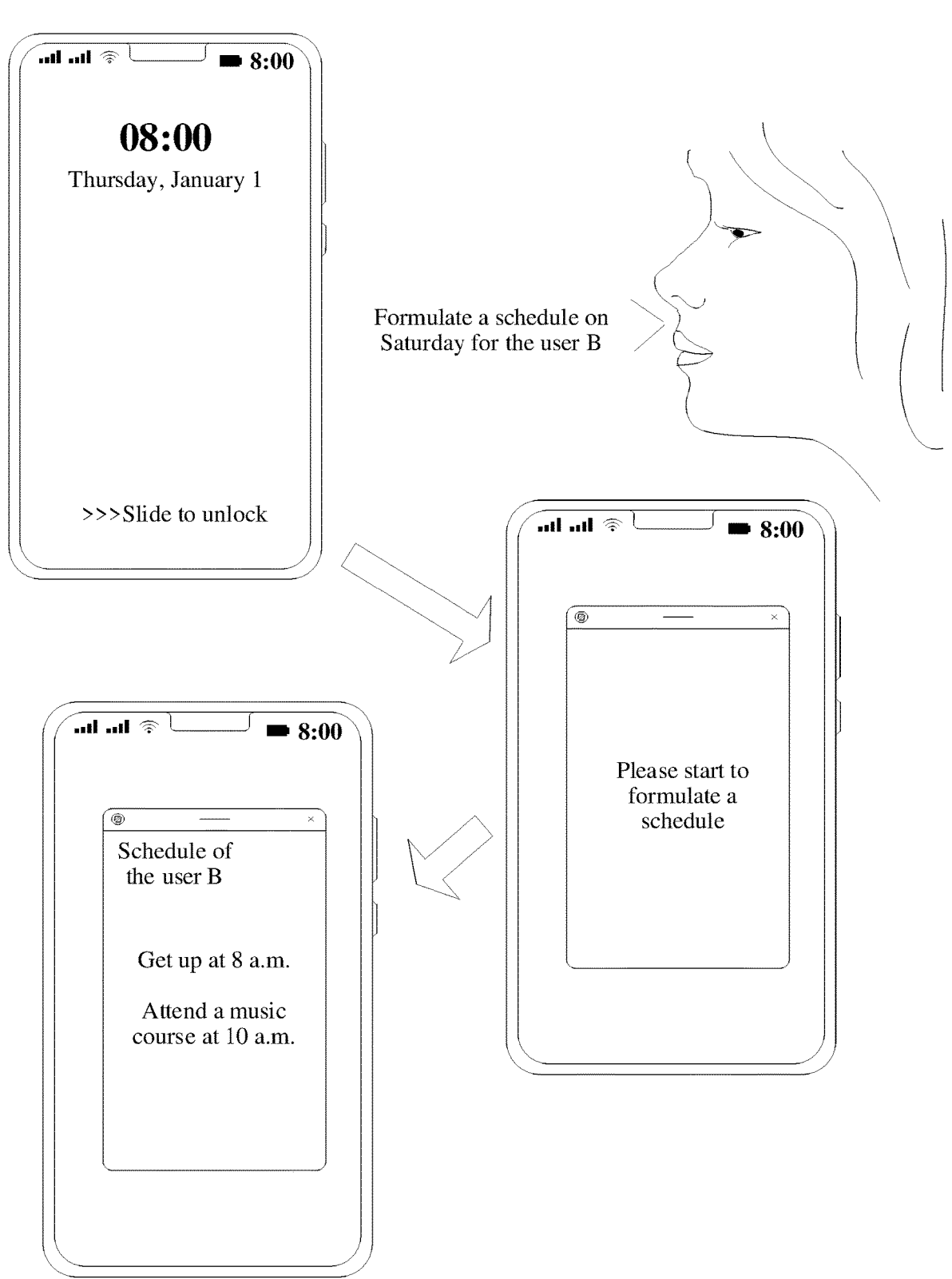
FIG. 9A is a schematic functional diagram of a voice assistant group according to an embodiment of this application.

In a possible implementation, a group member in the group may formulate a schedule for some or all of other group members. For example, in the family group, the user A may formulate a schedule on Saturday for the user B through manual input or by entering a voice instruction. Referring to FIG. 9A, the user A may say "formulate a schedule on Saturday for the user B", and the electronic device A may receive the voice data, and may prompt, on a display, the user to start to formulate a schedule. As shown in FIG. 9A, "please start to formulate a schedule" may be displayed on a display device. The user A may formulate a schedule for the user B based on a prompt of the electronic device A. For example, the user A may say "get up at 8 a.m.". The electronic device A may recognize the voice data, and record a related schedule. The user A may continue to say "attend a music course at 10 a.m.". Similarly, the electronic device A may continue to recognize the voice data, and record a related schedule. The foregoing manner is repeated, and the user A may record, in the electronic device A, the schedule formulated for the user B. The electronic device A may search the voice assistant group for the voice assistant of the user B. The electronic device A may send the formulated schedule to the voice assistant of the user B by using the voice assistant. The voice assistant of the user B may send the schedule formulated by the user A to the electronic device B. The electronic device B may display the received schedule on the display, and create a schedule on the electronic device B based on content in the schedule, to remind the user B. Optionally, the electronic device A may send, by using the voice assistant, the formulated schedule to some or all of the electronic devices B associated with the user identifier of the user B. The electronic device A may send, by using the voice assistant, a request message for obtaining whether the user is using the electronic device to the electronic device associated with the user identifier of the user B. The electronic device associated with the user identifier of the user B may determine, based on a sensor, a camera, and/or an audio module, whether the user is using the electronic device, and send an obtained result to an electronic device A. The electronic device A may send, by using the voice assistant, the formulated schedule to the electronic device that is being used by the user.

Figure 9B:
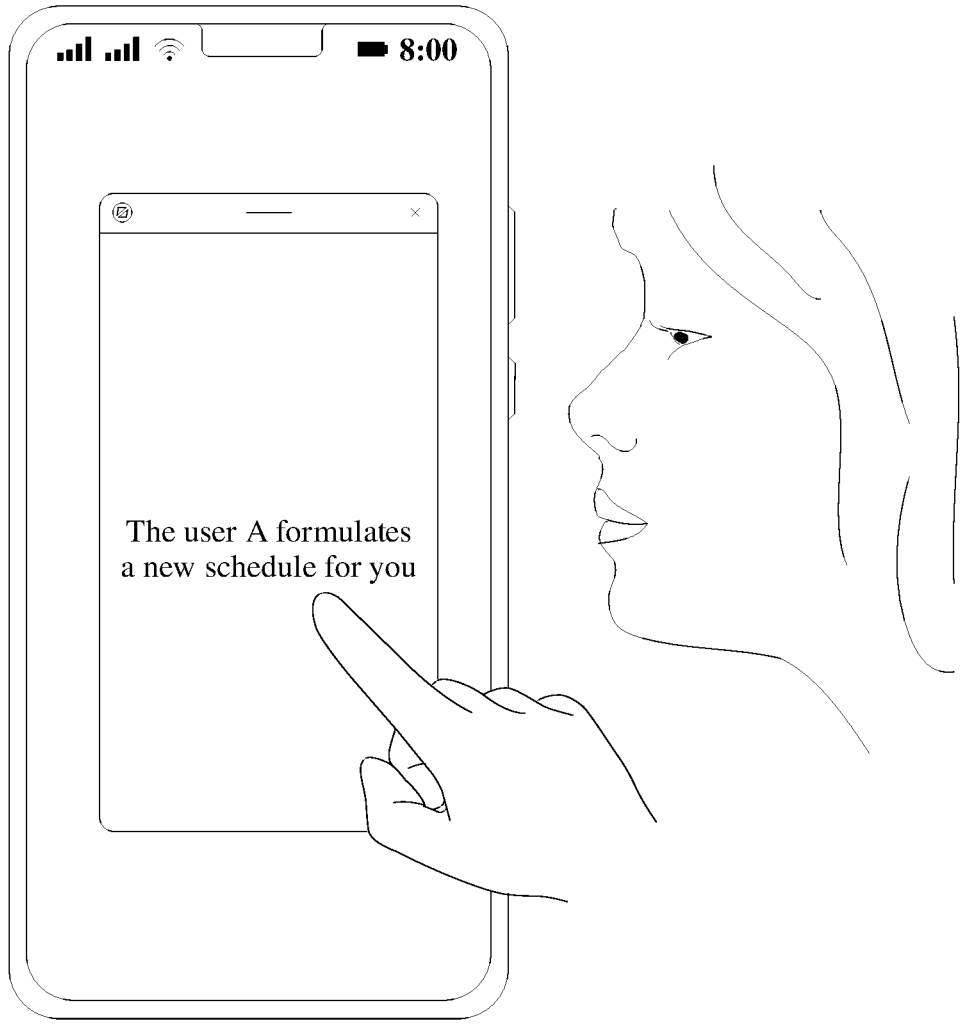
FIG. 9B is a schematic functional diagram of a voice assistant group according to an embodiment of this application.
Figure 9C:
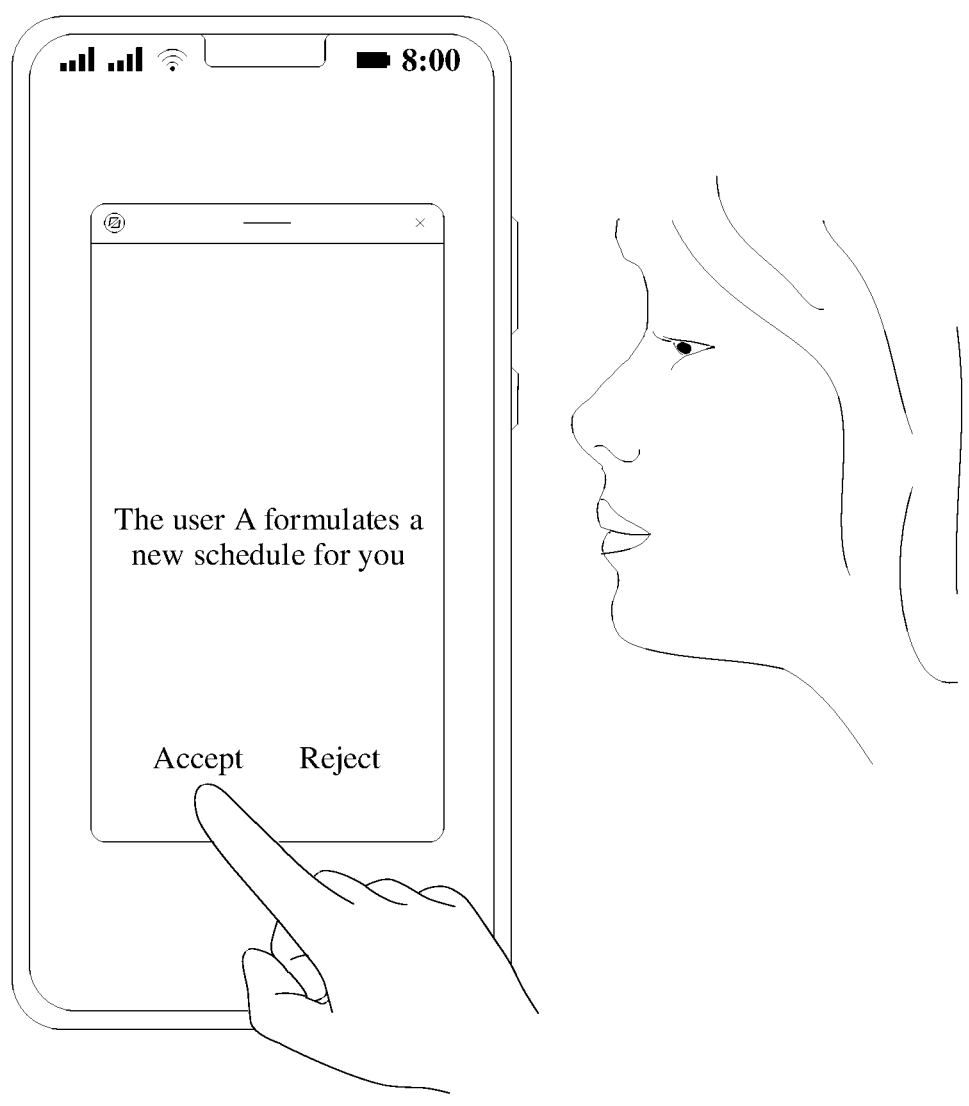
FIG. 9C is a schematic functional diagram of a voice assistant group according to an embodiment of this application.

Optionally, after receiving the schedule formulated by the user A for the user B, the electronic device B may prompt, on the display, the user B with information indicating that a user has formulated a schedule for the user B. Referring to FIG. 9B, the electronic device B may display information "the user A has formulated a schedule for you. Please have a view" on the display, and the user B may choose to view or not to view the schedule. Optionally, the user B may further choose whether to accept the schedule formulated by the user A for the user B. Referring to FIG. 9C, the user B may choose to accept or reject, through manual input or by entering a voice instruction, the schedule formulated by the user A. If the user B accepts the schedule formulated by the user A for the user B, the electronic device B may create a schedule based on the content in the schedule. If the user B rejects the schedule formulated by the user A for the user B, the electronic device B does not need to create a schedule. In addition, the electronic device B may feed back information indicating whether the user B accepts the formulated schedule to the electronic device A, and the electronic device A may display a selection of the user B on the display.

Based on the solution, the voice assistant service can enable more users to participate, to implement interaction between a plurality of users, and more conveniently provide the voice assistant service for the user.

In the electronic device control method provided in this embodiment of this application, when the user A needs to use a voice assistant service, an environment in which the electronic device is located may be further considered, and a proper manner may be selected to provide a related service for the user A. Description is provided below with reference to the accompanying drawings.

Figure 10:
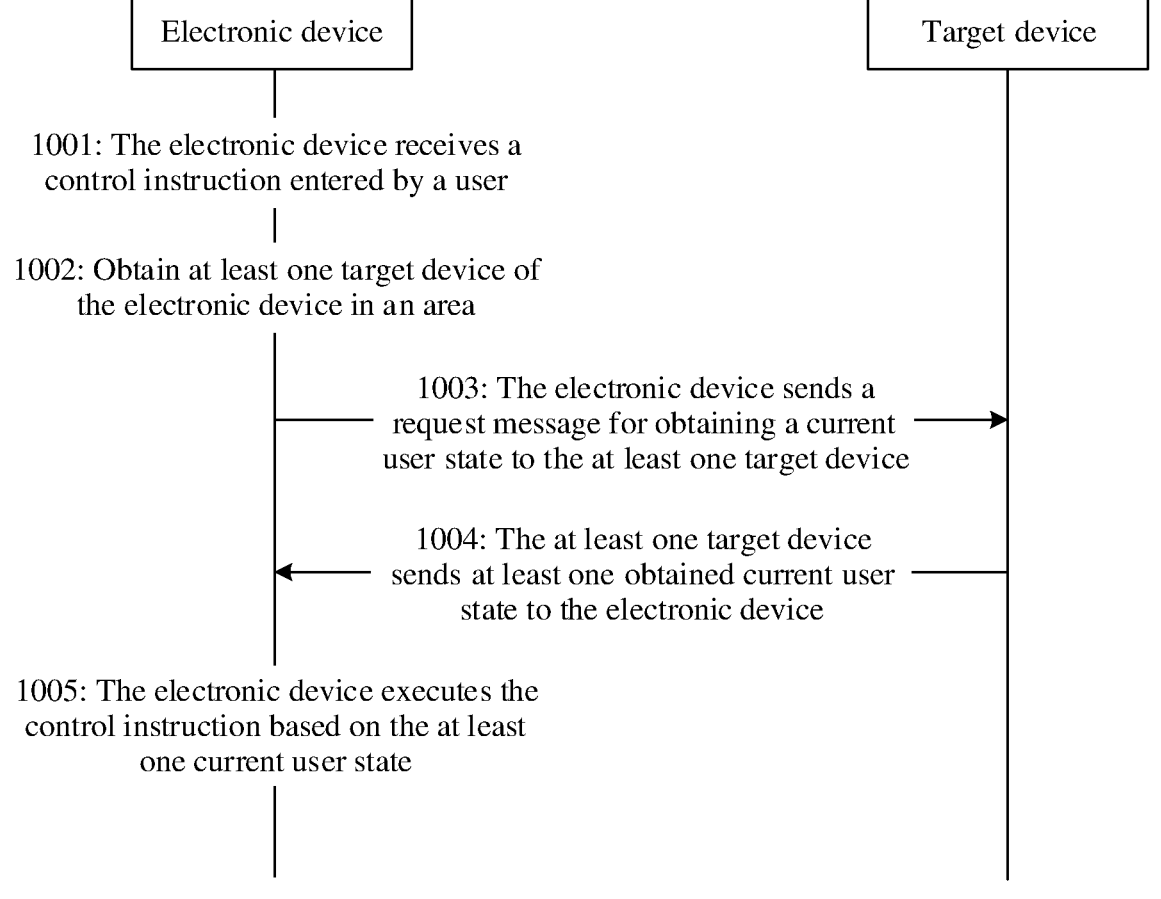
FIG. 10 is an example flowchart of an electronic device control method according to an embodiment of this application.

FIG. 10 is an example flowchart of an electronic device control method according to an embodiment of this application. The method includes the following steps.

1001: An electronic device receives a control instruction entered by a user.

The electronic device has a user identifier. The user identifier may be used to identify identity information of the user, and the user identifier may be used to log in to a voice assistant service. The electronic device may first wake up the voice assistant service. The user may enter preset voice data that includes specified text content, to wake up the voice assistant service. After the voice assistant service is woken up, the voice assistant service may indicate, on a display, the user to enter the control instruction. The user may manually enter a control instruction "play music" on the electronic device. Alternatively, the user may say "play music", and enter a voice control instruction on the electronic device. The electronic device may receive, by using the receiver 170B or the microphone 170C shown in FIG. 2, the voice data entered by the user. The electronic device may perform text recognition on the voice data, to obtain the control instruction.

Figure 11A:
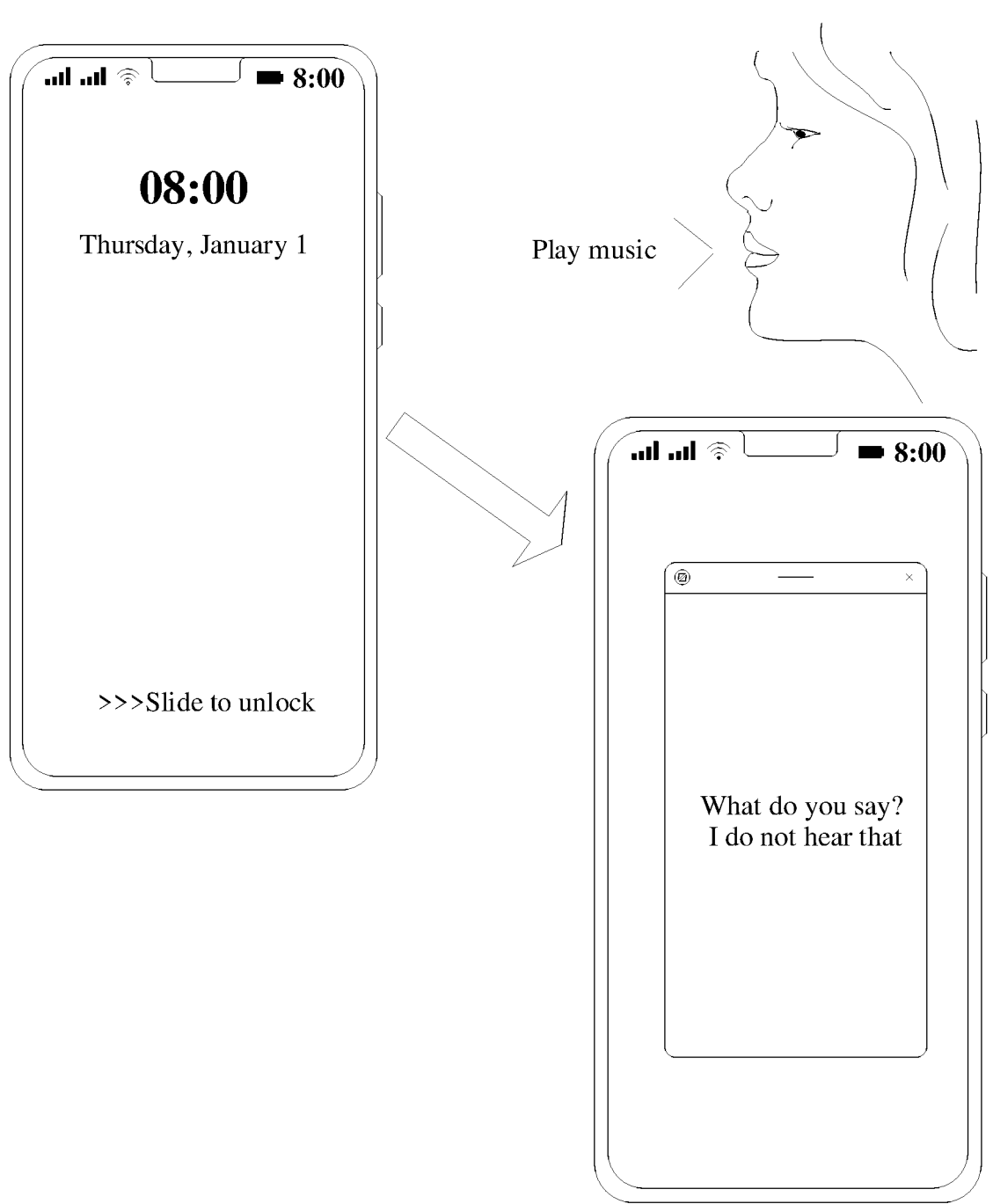
FIG. 11A is a schematic functional diagram of a voice assistant on an electronic device according to an embodiment of this application.

Optionally, if the electronic device does not receive the voice data entered by the user, the electronic device may prompt, by using a display device, the user to re-enter the voice data. For example, there is a noisy external environment and the user says in a relatively low voice, and therefore the electronic device does not receive the voice data entered by the user. Referring to FIG. 11A, the electronic device may display a prompt message such as "What do you say? I do not hear that" by using the display device, to prompt the user to re-enter the voice data.

1002: Obtain at least one target device of the electronic device in an area, that is, obtain another device adjacent to the electronic device, where the another device and the electronic device may be located in a same area.

The area may be a concept of space, and may refer to an indoor area. For example, the area may be an office area or a residential area. Optionally, the area may alternatively be a range in which short range communication can be performed. For example, the area may be a range that supports Bluetooth communication or a range that supports ZigBee (ZigBee) communication. The area may alternatively be an area in which the electronic device can be connected to a same gateway device. For example, the area may be an area in which a same wireless local area network (wireless local area network, WLAN) is connected, or may be an area in which a same wireless access point (access point, AP) is connected.

Figure 12:
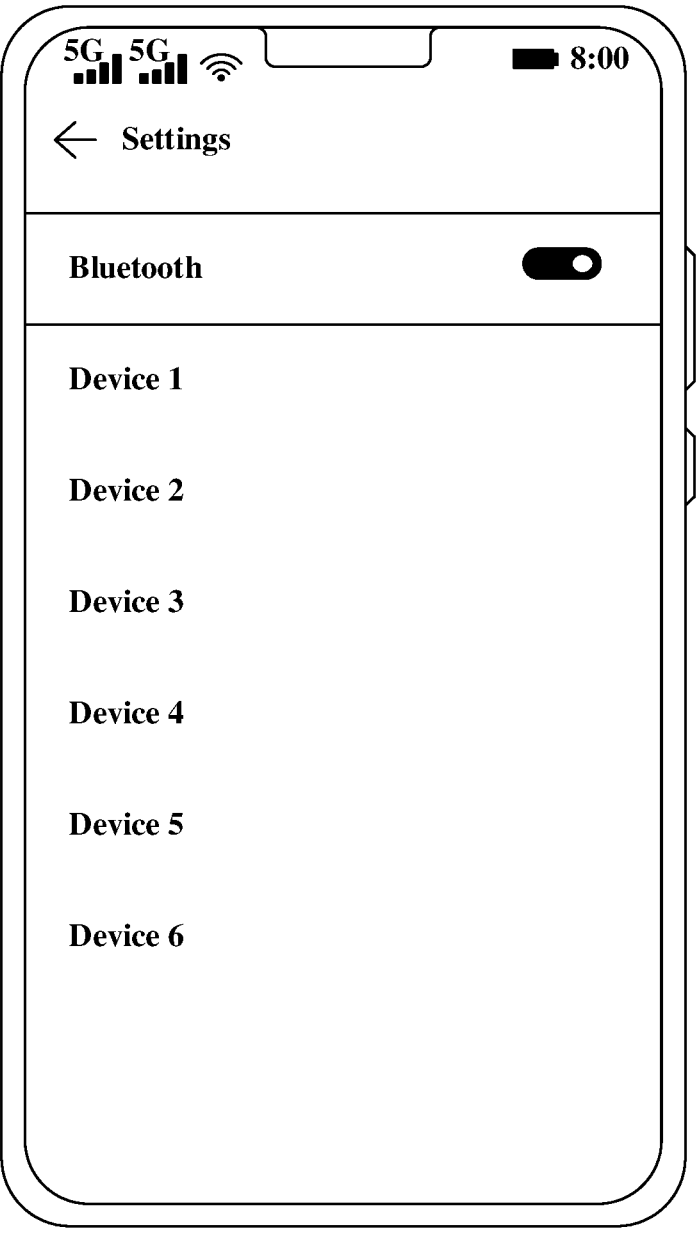
FIG. 12 is a schematic diagram of a method for determining a target device in a same area according to an embodiment of this application.

For example, the electronic device may search for a Bluetooth device. Referring to FIG. 12, the Bluetooth device found by the electronic device may be used as the at least one target device. For another example, the electronic device may receive device information sent by a connected gateway device. The device information may be information about a device communicatively connected to the gateway. Therefore, the device indicated by the device information is used as the at least one target device.

Optionally, the target device may be a device that is in a same area as the electronic device and that is in a same voice assistant service group as the electronic device. Alternatively, the electronic device may determine the at least one target device by using location information shared by a group member in the voice assistant service group. For example, the electronic device may determine a distance between a location of the group member and a location of the electronic device in the voice assistant service group based on the location information shared by the group member, determine a distance less than or equal to a specified value in a plurality of calculated distances, and use a device corresponding to the distance as the at least one target device.

1003: The electronic device sends a request message for obtaining a current user state to the at least one target device.

The request message may carry the user identifier of the electronic device. The electronic device may send the request message for obtaining the current user state to the at least one target device by using a mobile communication network, a wireless local area network, or a Bluetooth device. Alternatively, the electronic device may forward the request message for obtaining the current user state to the at least one target device by using a third-party device. The third-party device herein may be a same gateway device connected to the electronic device and the at least one target device, or may be a server of a voice assistant service that is logged in to on the electronic device.

When the electronic device forwards the request message for obtaining the current user state to the at least one target device by using the server of the voice assistant service that is logged in to, the electronic device and the at least one target device may be in a same voice assistant service group. The electronic device may send the request message for obtaining the current user state to the server of the voice assistant service. The server may send the request message for obtaining the current user state to a voice assistant service that is logged in to on the at least one target device, and the voice assistant service that is logged in to on the target device sends the request message to the target device. Optionally, the server of the voice assistant service that is logged in to on the electronic device may send the request message to the at least one target device, for example, may send the request message to the at least one target device by using a mobile communication network or a wireless local area network.

The current user state may mean whether there is a user in a range that can be monitored by the target device, and if there is a user, what the user is currently doing. For example, there is a user in the range monitored by the target device, and the user is sleeping or learning. Alternatively, the current user state may be an external environment required by a user. For example, the user requires a quiet external environment, or the user does not have a requirement on a noise level of the external environment. If there is no user in the range that can be monitored by the target device, the current user state may be that there is no user.

In a possible implementation, the target device may determine, based on a pressure sensor or a touch sensor, whether the user is using the target device. For example, if the user is using the target device, it may be considered that there is a user, and the user has no requirement on the noise level of the external environment.

In another possible implementation, the target device may determine the current user state by using a camera. For example, the target device may turn on the camera to determine whether there is a user, and if there is a user, determine whether the user is working, learning, or sleeping.

In still another possible implementation, the target device may determine the current user state by using an audio module. For example, the target device may turn on the audio module to determine whether there is a user. The target device may turn on a microphone to determine whether there is a user who is speaking, and if there is a user who is speaking, may consider that there is a user, or if there is no user who is speaking, may consider that there is no user.

It should be understood that the target device may determine the current user state by using the pressure sensor or the touch sensor, the camera, and the audio module. For example, the target device may turn on the camera and the audio module. The target device determines, by using the camera, that there is a user, but determines, by using the audio module, that there is no user who is entering voice data. Therefore, the target device may consider that the user is currently working, learning, or sleeping, and the user requires a quiet external environment.

The target device may turn on the camera and the microphone. The target device determines, by using the camera, that there is a face, and therefore may consider that there is a user. The target device further determines, by using the microphone, that the user does not enter voice data. Therefore, the target device may consider that the user is currently working, learning, or sleeping. Therefore, the target device may determine that the current user state is that there is a user, and the user is learning, working, or sleeping, that is, the user requires a quiet external environment.

The target device may obtain authorization of the user before obtaining the current user state. For example, the target device may obtain the authorization of the user before obtaining the current user state each time, and may obtain the current user state by using the foregoing method after obtaining the authorization of the user. For another example, the target device may obtain the authorization of the user before obtaining the current user state for the first time, and after the authorization of the user is obtained, each time the target device obtains the current user state, it may be considered by default that the authorization of the user is obtained.

In this embodiment of this application, the target device may be a mobile phone, a tablet computer, a wearable device (for example, a watch, a band, or a smart helmet), a vehicle-mounted device, a smart home device, an augmented reality (augmented reality, AR) device/a virtual reality (virtual reality, VR) device, a notebook computer, an ultra-mobile personal computer (ultra-mobile personal computer, UMPC), a netbook, a personal digital assistant (personal digital assistant, PDA), or the like.

Figure 11B:
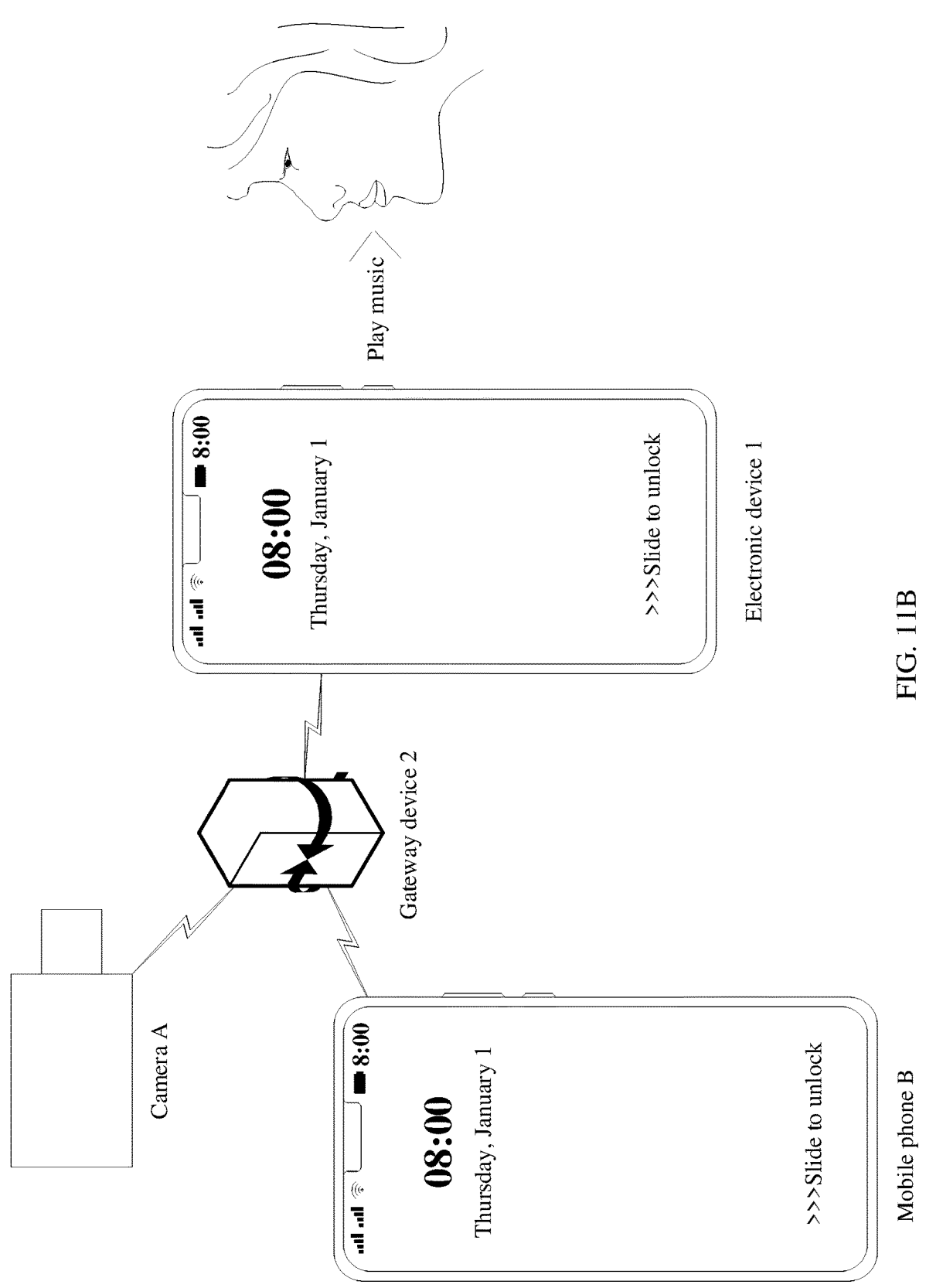
FIG. 11B is a schematic diagram of a scenario of an electronic device control method according to an embodiment of this application.

Referring to FIG. 11B, the electronic device may determine at least one target device in an area. The electronic device determines that the target device in the area includes a camera A and a mobile phone B. The electronic device may send a request message for obtaining a current user state to the camera A and the mobile phone B. Therefore, the camera A determines, in a range that can be scanned, whether there is a user and what the user is doing, the mobile phone B may obtain the current user state by using at least one of a sensor, a camera, and an audio module, and each of the camera A and the mobile phone B may send the obtained current user state to the electronic device A.

1004: The at least one target device sends at least one obtained current user state to the electronic device.

The target device may send the at least one obtained current user state to the electronic device by using a mobile communication network, a wireless local area network, or a Bluetooth device. Alternatively, the target device may forward the at least one obtained current user state to the electronic device by using a third-party device. The third-party device herein may be a same gateway device connected to the target device and the electronic device, or may be a server of the voice assistant service that is logged in to on the target device.

When the at least one target device forwards the at least one obtained current user state to the electronic device by using the server of the voice assistant service that is logged in to, the at least one target device and the electronic device may be in a same voice assistant service group. The at least one target device may send the at least one obtained current user state to the server of the voice assistant service. The server may send the at least one obtained current user state to the voice assistant service that is logged in to on the electronic device, and the voice assistant service that is logged in to on the electronic device sends the at least one current user state to the electronic device. Optionally, the server of the voice assistant service that is logged in to on the at least one target device may send the at least one current user state to the electronic device, for example, may send the at least one current user state to the electronic device by using a mobile communication network or a wireless local area network.

1005: The electronic device executes the control instruction based on the at least one current user state.

If there is a state in which a user is learning, working, or sleeping in the at least one current user state, that is, there is a current user state in which a user requires a quiet external environment, when executing the control instruction, the electronic device may control volume to be within a specified volume range. If there is no state in which a user is learning, working, or sleeping in the at least one current user state, that is, there is no current user state in which a user requires a quiet external environment, when executing the control instruction, the electronic device may determine at least one peripheral device in a current network connection, and may execute the control instruction by using the at least one peripheral device. The specified volume range herein may be preset, for example, may be volume 5 to volume 10. This is not specifically limited in this application.

For example, when the control instruction is "play music", if there is the state in which a user is learning, working, or sleeping in the at least one current user state received by the electronic device, when playing music, the electronic device may control the volume to be within the specified volume range. If there is no state in which a user is learning, working, or sleeping in the at least one current user state received by the electronic device, the electronic device may search for the peripheral device in the current network connection. If the electronic device finds that there is an audio device, for example, a Bluetooth sound box, in the current network connection, the electronic device may play music by using the audio device.

When the electronic device determines that there is no peripheral device in the current network connection, the electronic device may execute the control instruction. For example, when the control instruction is "play music", there is no state in which a user is learning, working, or sleeping in the at least one current user state received by the electronic device, and the electronic device finds no peripheral device in the current network connection, the electronic device may open an application that can play music, and play music. When the electronic device plays music, the volume may be greater than the specified volume range.

In a possible implementation, after the electronic device executes the control instruction, the target device may receive voice data from the user. For example, a user A enters a voice control instruction "play music" on an electronic device 1, and the electronic device 1 obtains a current user state from a target device 2 by performing step 1002 to step 1004. There is a state in which a user B is working, learning, or sleeping in the obtained current user state. Therefore, the electronic device 1 may open an application that can play music, and control volume to be within a specified volume range. In this case, the user B may enter voice data on the target device 2, for example, voice data such as "I am learning" or "be quiet", to prompt the user A to lower the volume. After receiving the voice data, the target device 2 may perform text recognition. The target device 2 may send a recognition result to the electronic device 1, so that the electronic device 1 may lower the volume based on the recognition result. A value by which the electronic device 1 lowers the volume may be preset.

Figures 1, 2, 13A:
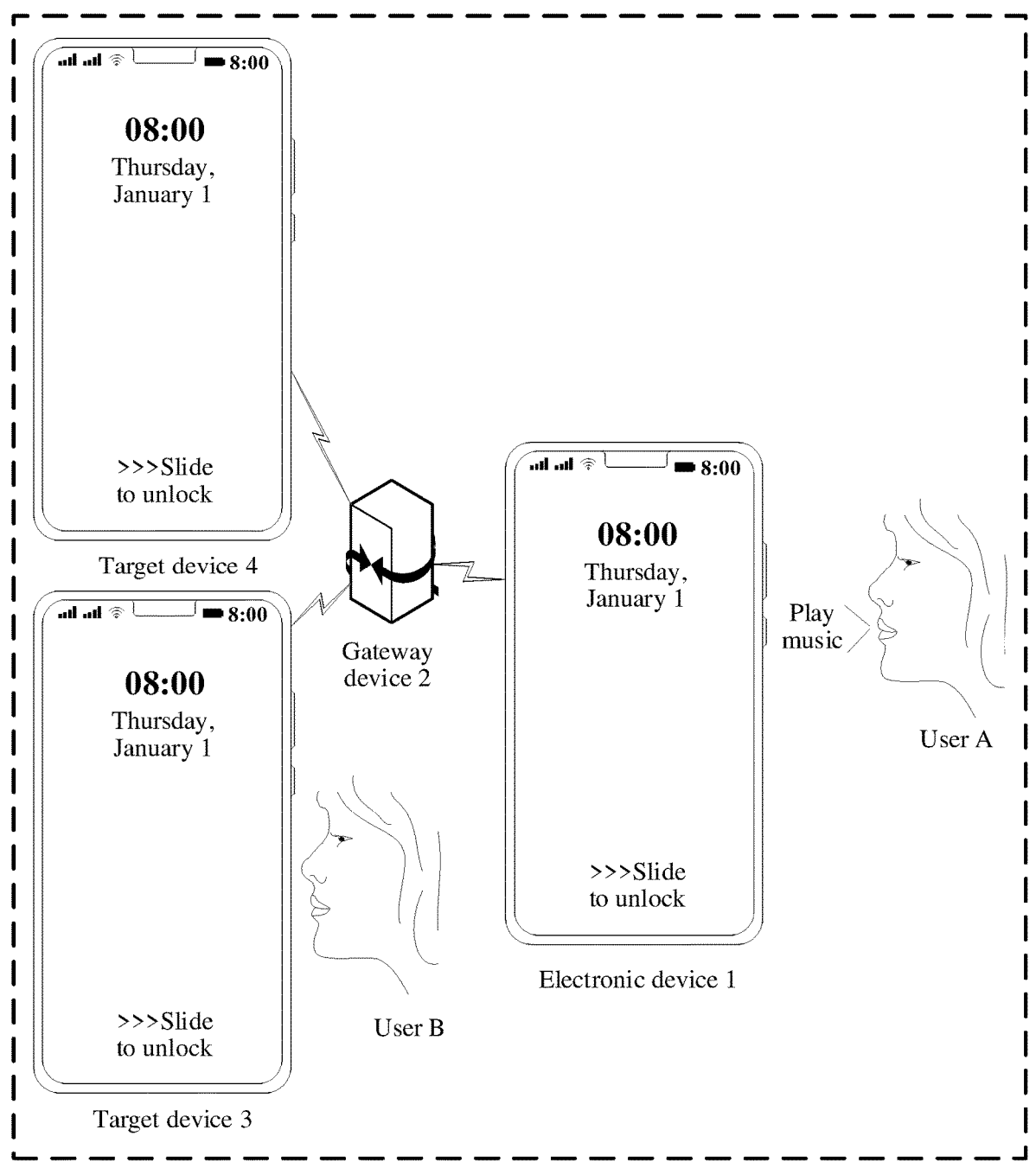
Figures 1, 2, 13A:
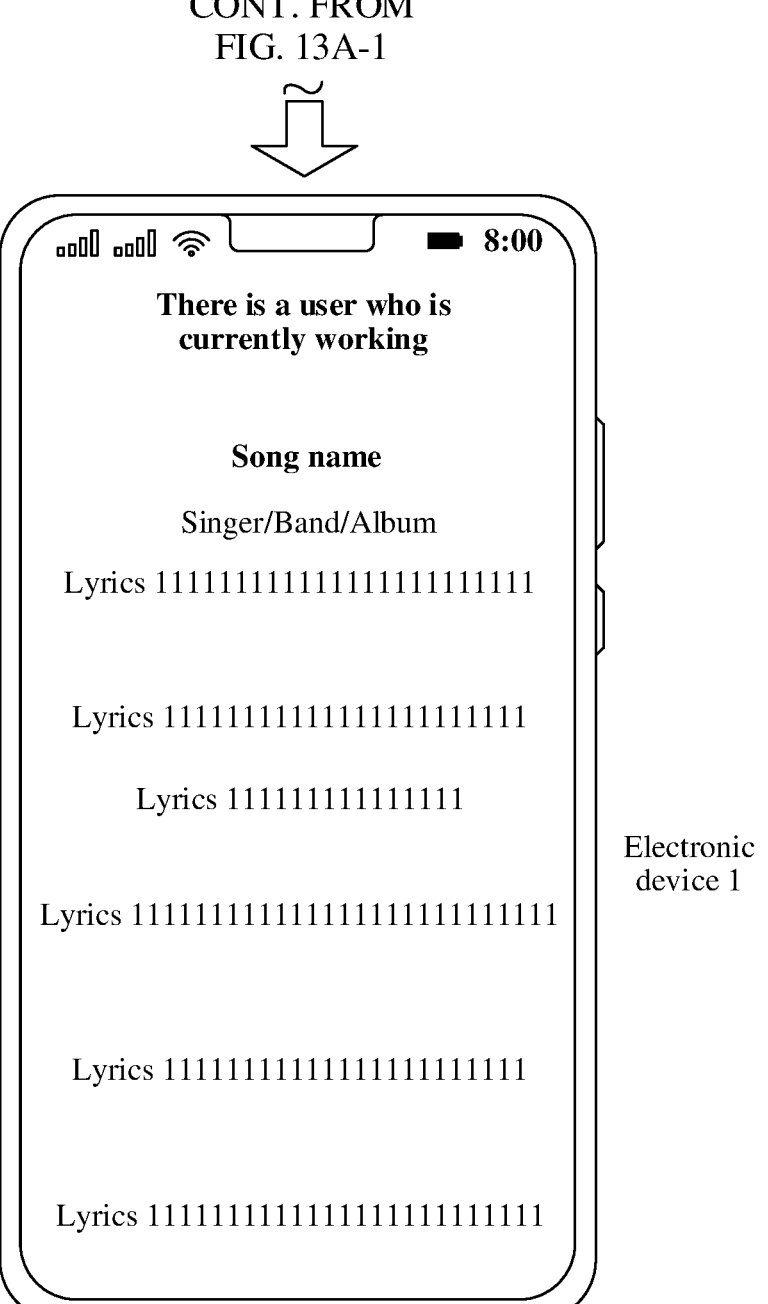

Referring to FIG. 13A-1 and FIG. 13A-2, the user A wants to play music in a living room, and therefore may wake up the electronic device 1 of the user A, and enter a voice control instruction, for example, "play music". Before performing an operation of playing music, the electronic device 1 may first determine at least one target device based on the voice instruction. The electronic device 1 may determine the at least one target device by using a connected gateway device 2. The electronic device 1 receives information that is sent by the gateway device 2 and that is about a device communicatively connected to the gateway device 2. The electronic device 1 may determine, based on the device information, that there is a target device 3 and a target device 4. The electronic device 1 may send a request message for obtaining a current user state to the target device 3 and the target device 4 by using the gateway device 2. The target device 3 and the target device 4 receive the request message, and turn on cameras and/or audio modules to obtain user states. The target device 3 determines that there is a user and the user is working, and the target device 4 determines that there is no user. The target device 3 and the target device 4 send the obtained current user states to the electronic device 1 by using the gateway device 2. The electronic device 1 determines that there is the state in which a user is working in the current user state. Therefore, the electronic device 1 may open the application that plays music, and control, based on the state in which a user is working, volume to be within a relatively low range (for example, a volume value is 10).

Figures 1, 13B:
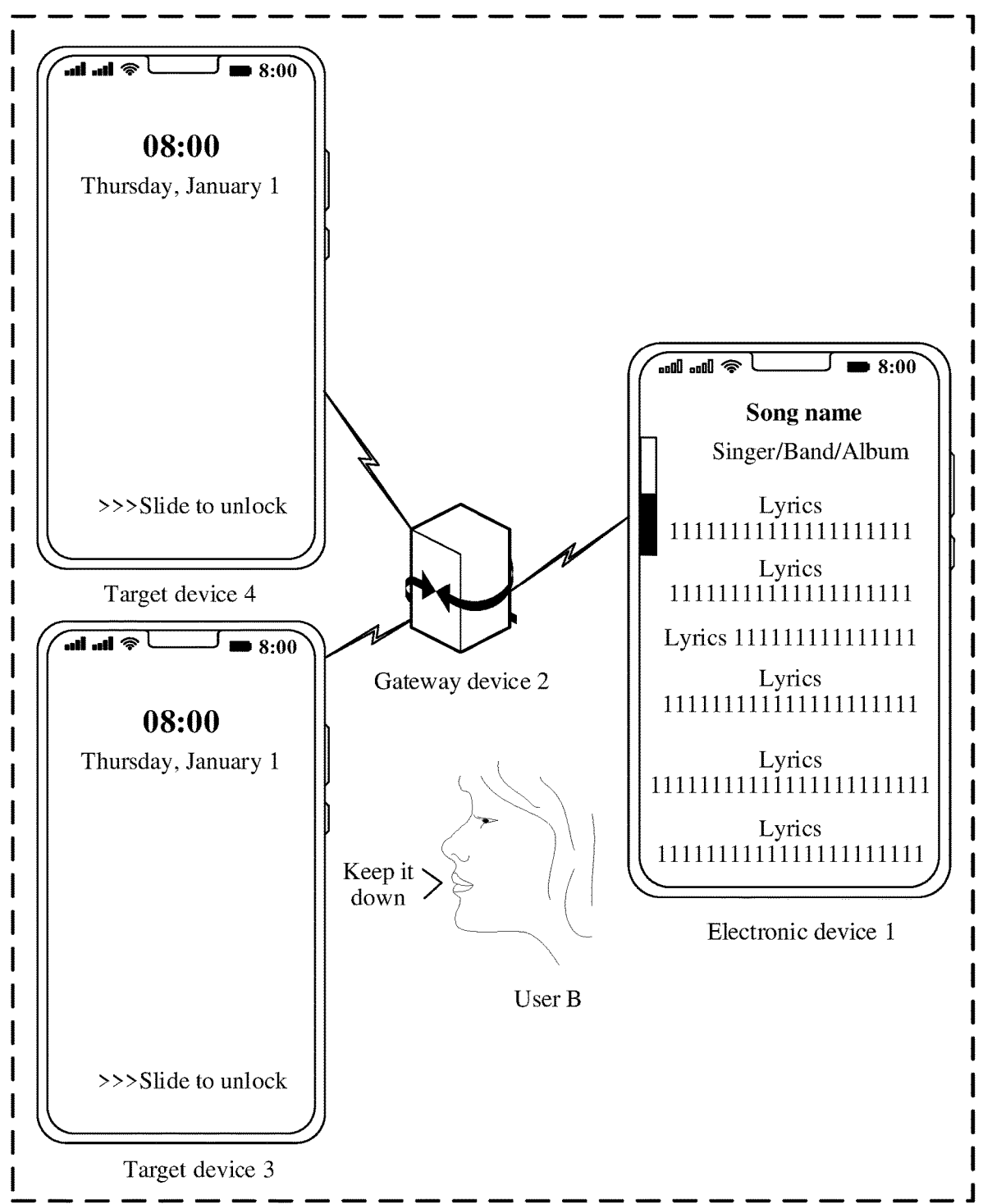
Figures 1, 2, 13B:
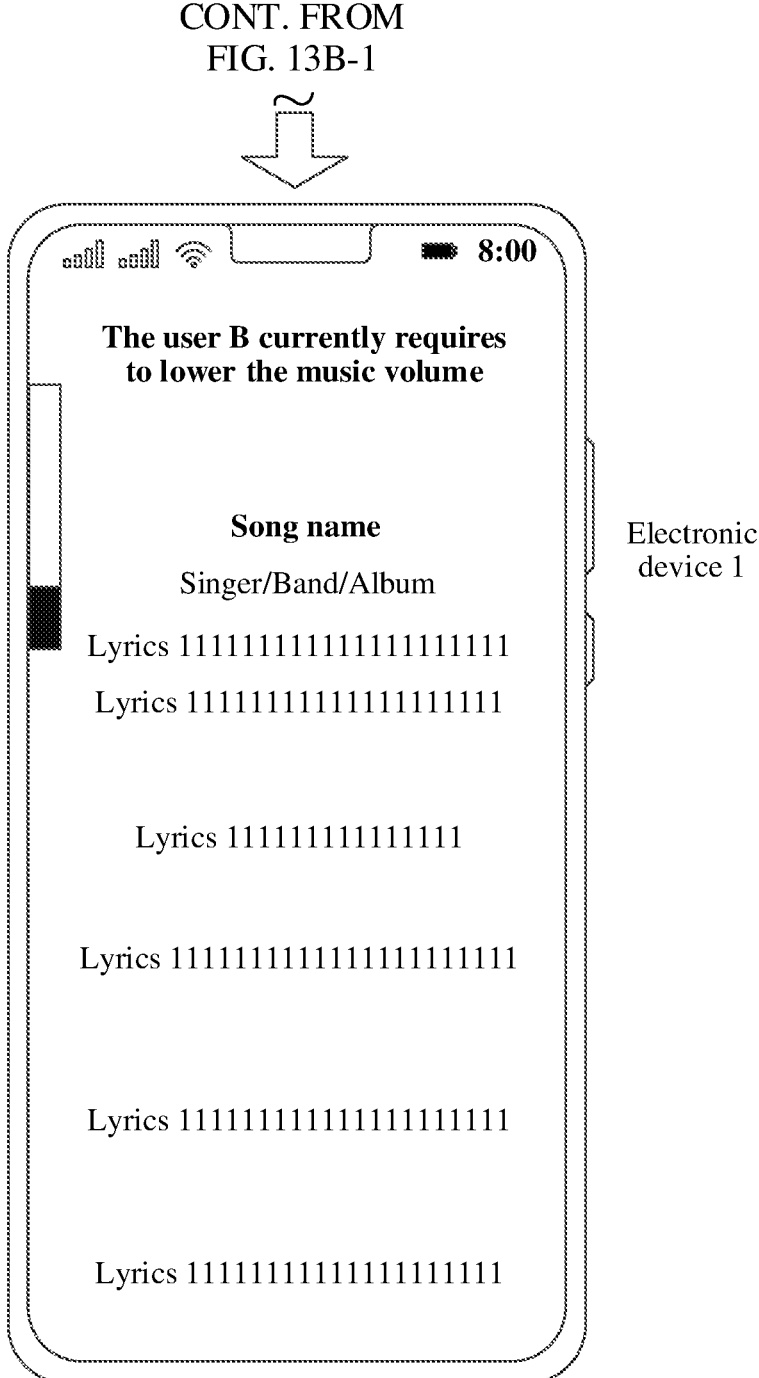

Referring to FIG. 13B-1 and FIG. 13B-2, the target device 3 receives a voice instruction of the user B. For example, the voice instruction may be "Keep it down". The target device 3 may send the voice instruction or a reminder message generated based on the voice instruction to all electronic devices in an area to which the target device 3 belongs. Optionally, the target device 3 first determines whether a media service is running on the target device 3. If the media service is running on the target device 3, the target device 3 may respond to the voice instruction, and lower volume of the media service. If no media service is running on the target device 3, the target device 3 may send the voice instruction or the reminder message generated based on the voice instruction to all the electronic devices in the area to which the target device 3 belongs.

In an example, the target device 3 may determine whether the current user state is sent within a time period existing before the voice instruction is received. If the target device 3 sends the current user state, the target device 3 may send the voice instruction or the reminder message generated based on the voice instruction to a device that receives the current user state. For example, the target device 3 sends the current user state to the electronic device 1 within the time period existing before the voice instruction is received. Therefore, the target device 3 may send the voice instruction or the reminder message to the electronic device 1.

In another example, the target device 3 may determine whether a media service is running on another device in the area to which the target device 3 belongs. For example, the target device 3 may send a request message for obtaining a current device state to the another device in the area to which the target device 3 belongs. The another device may determine whether a media service is currently running on the another device, and send the obtained current device state to the target device 3. Optionally, when the media service is running on the another device, the another device may send a response message to the target device 3, to notify the target device 3 that the media service is currently running on the another device. The target device 3 may send the voice instruction or the reminder message generated based on the voice instruction to the another device on which the media service is currently running. After receiving the voice instruction or the reminder message corresponding to the voice instruction, the electronic device 1 may respond to the voice instruction or the reminder message, and lower the current music volume, for example, lower the volume to 5. Optionally, the electronic device 1 may further display a prompt message such as "the user B currently requires to lower the music volume" on a display. Alternatively, the electronic device 1 may ask for consent of the user A before lowering the music volume. For example, the electronic device 1 may display information "the user B currently requires to lower the volume, and whether to agree" on the display, and when the user A agrees, lower the music volume. The user A may enter, on the electronic device 1 manually or by entering a voice instruction, an instruction indicating whether to agree.

In a possible implementation, when executing the control instruction, the electronic device may further obtain at least one control device in the current network connection. The control device herein may be a device configured to control a smart appliance or in-vehicle infotainment. The electronic device may send a control instruction to the control device, so that the control device can control the smart appliance or the in-vehicle infotainment based on the control instruction.

Figures 1, 2, 14A:
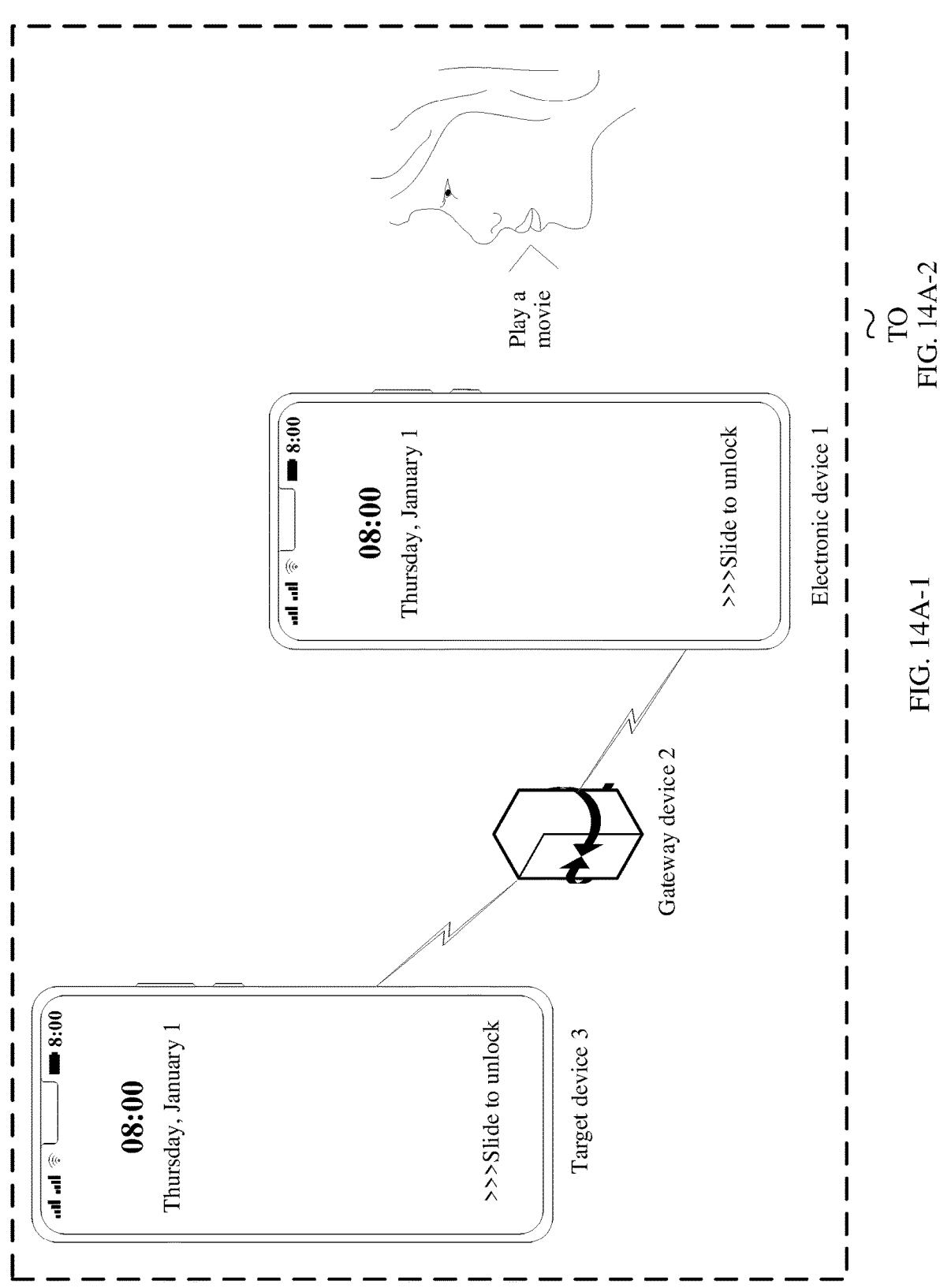
Figures 1, 2, 14A:
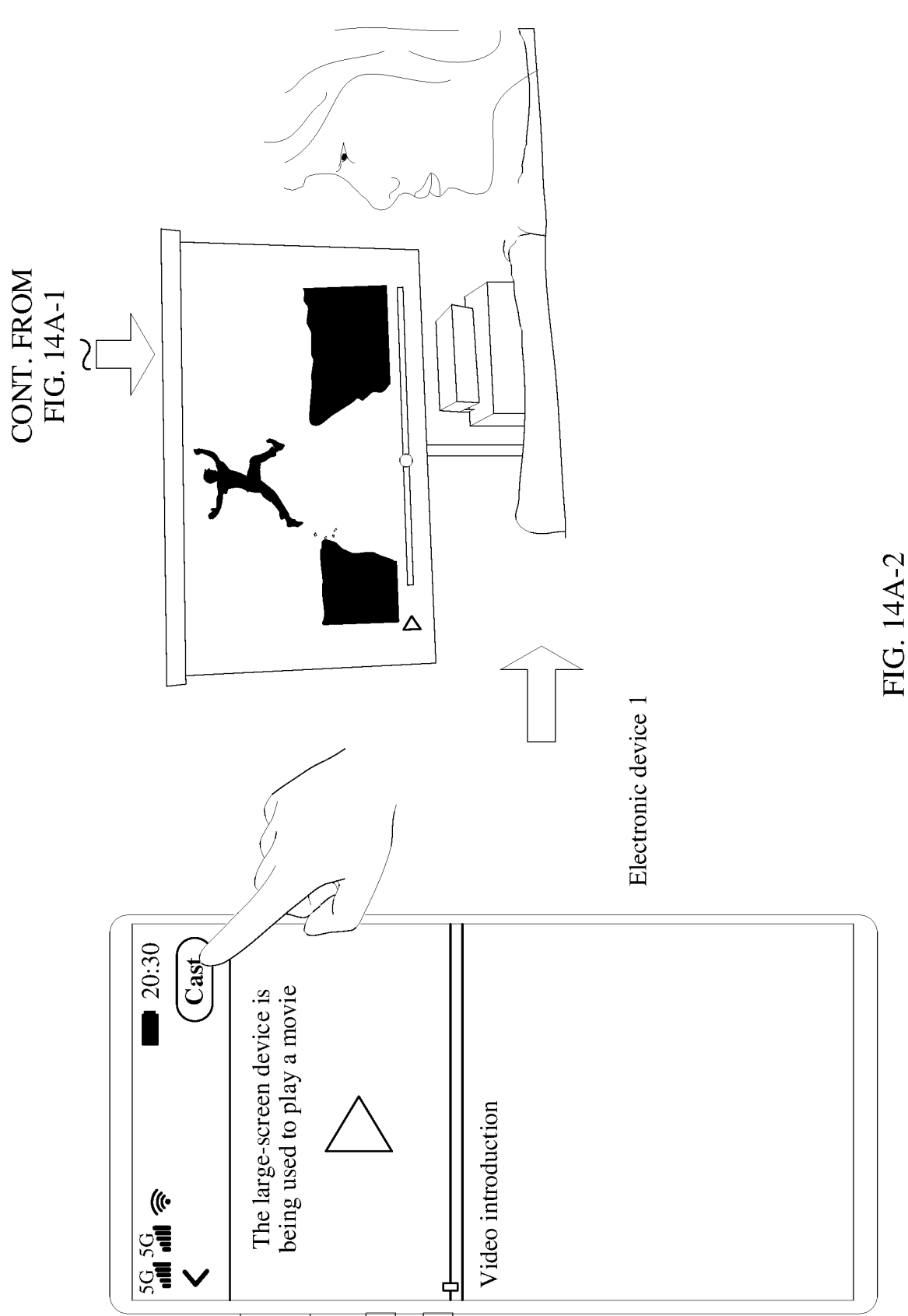

Referring to FIG. 14A-1 and FIG. 14A-2, the user A wants to watch a movie in the living room, and therefore may wake up the electronic device 1, and enter a voice control instruction, for example, "play a movie". The electronic device 1 determines the target device 3 by using the connected gateway device 2. The electronic device 1 may send a request message for obtaining a current user state to the target device 3. The target device 3 may receive the request message, and turn on the camera and an audio device. The target device 3 determines that there is no user, and sends the current user state to the electronic device 1. The electronic device 1 may determine that there is no current user state in which a user is learning, working, or sleeping in the obtained current user state. Therefore, the electronic device 1 may play a movie by using a large-screen device in a current network connection. Optionally, the electronic device 1 may display, on the display, a prompt message indicating that there is a large-screen device in the current network connection and the large-screen device is being used to play a movie. The electronic device 1 displays, on the display, a request message indicating that there is a large-screen device in the current network connection and indicating whether to use the large-screen device to play a movie, and after the user agrees, may play a movie by using the large-screen device. The user may enter, manually or by using a voice, an instruction indicating whether to agree.

Figure 14B:
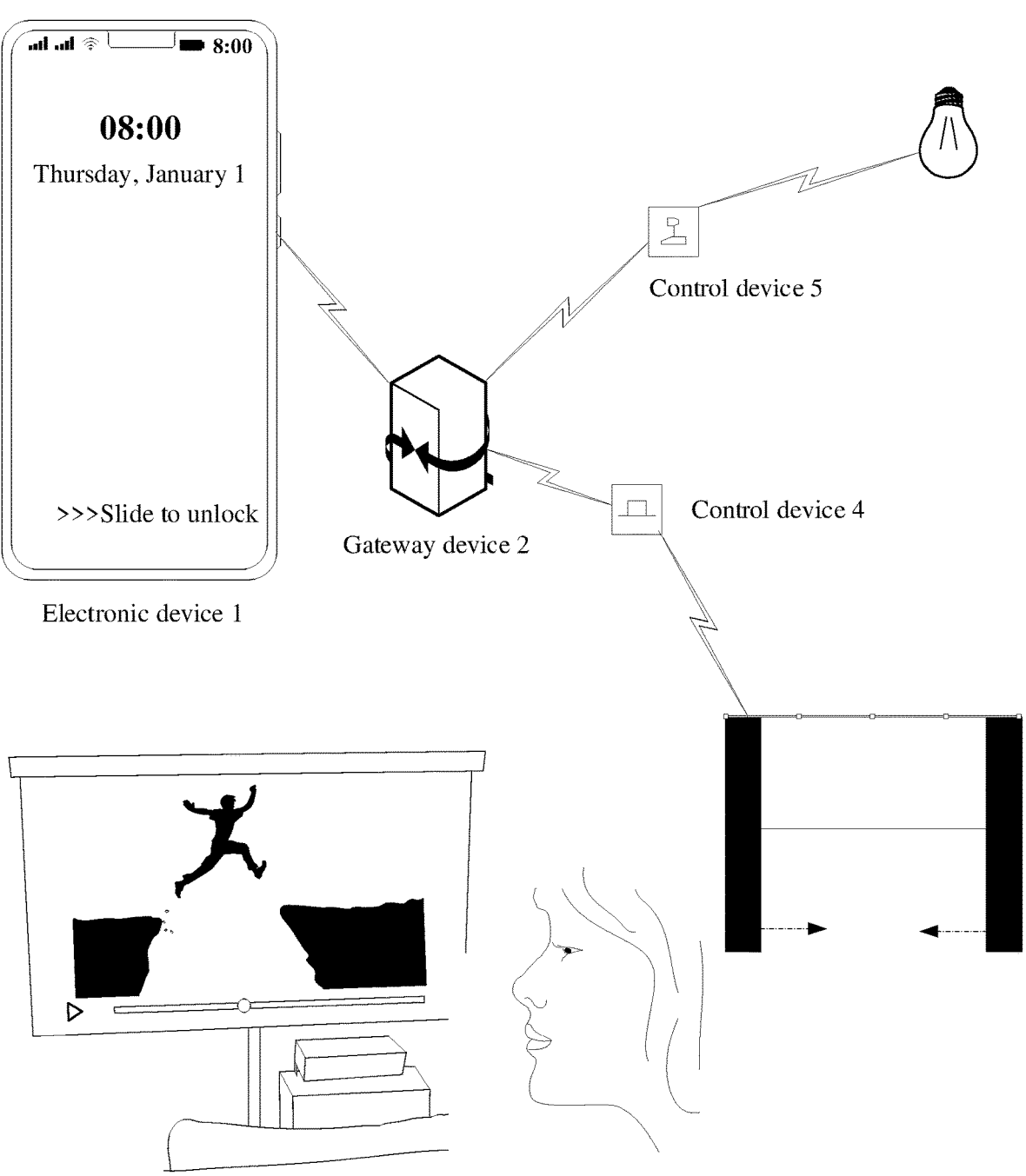
FIG. 14B is a schematic diagram of a scenario of an electronic device control method according to an embodiment of this application.
Figures 1, 2, 14C:
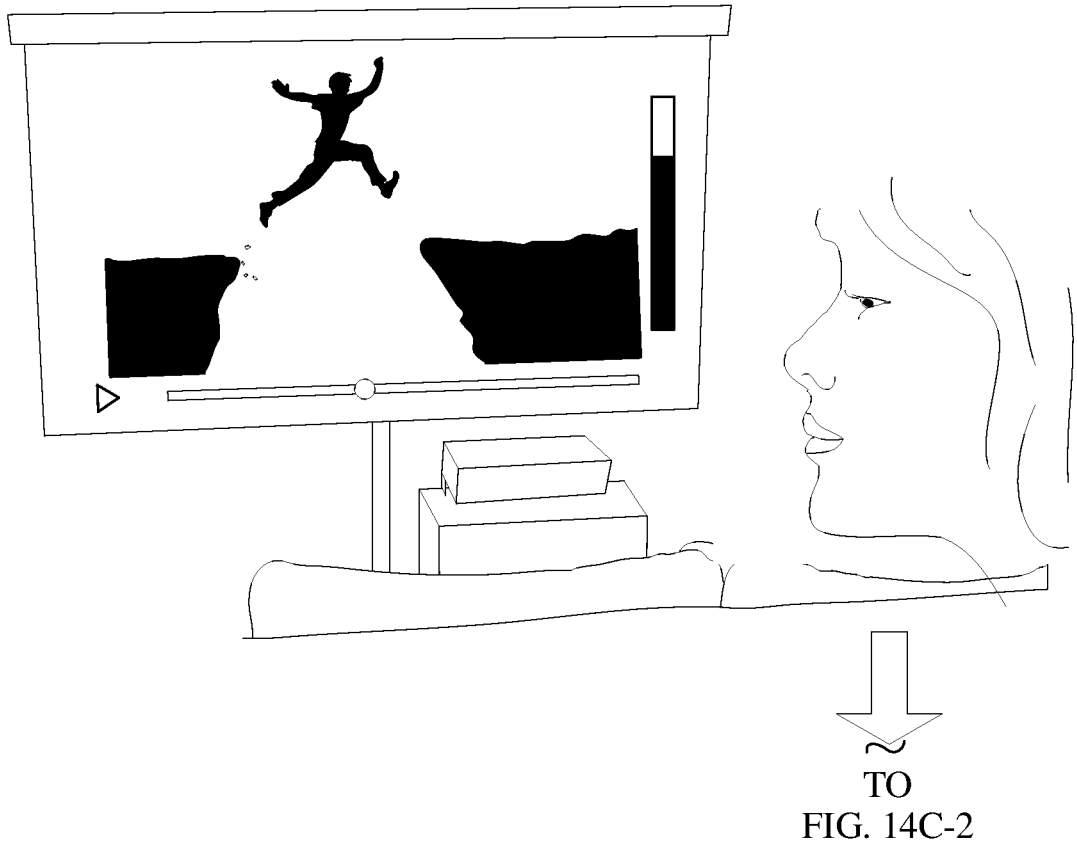
Figures 1, 2, 14C:
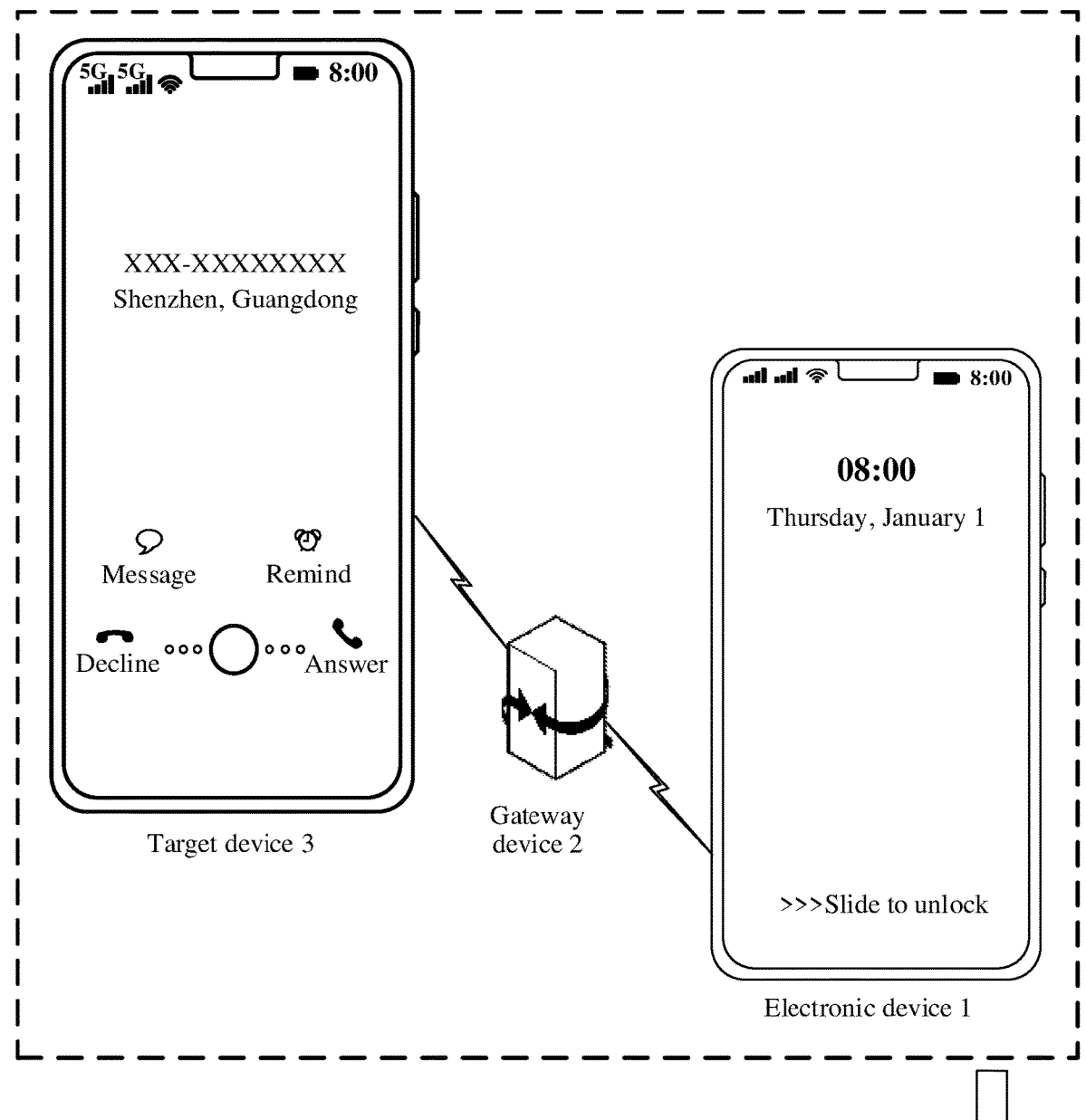
Figures 2, 3, 14C:
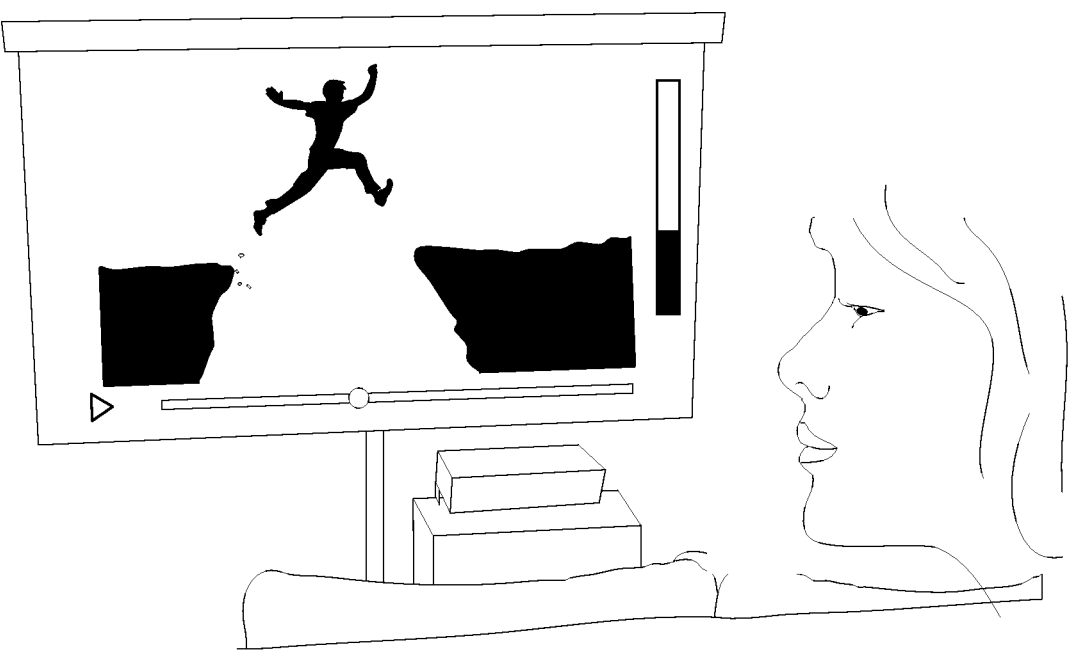
Figures 1, 14D:
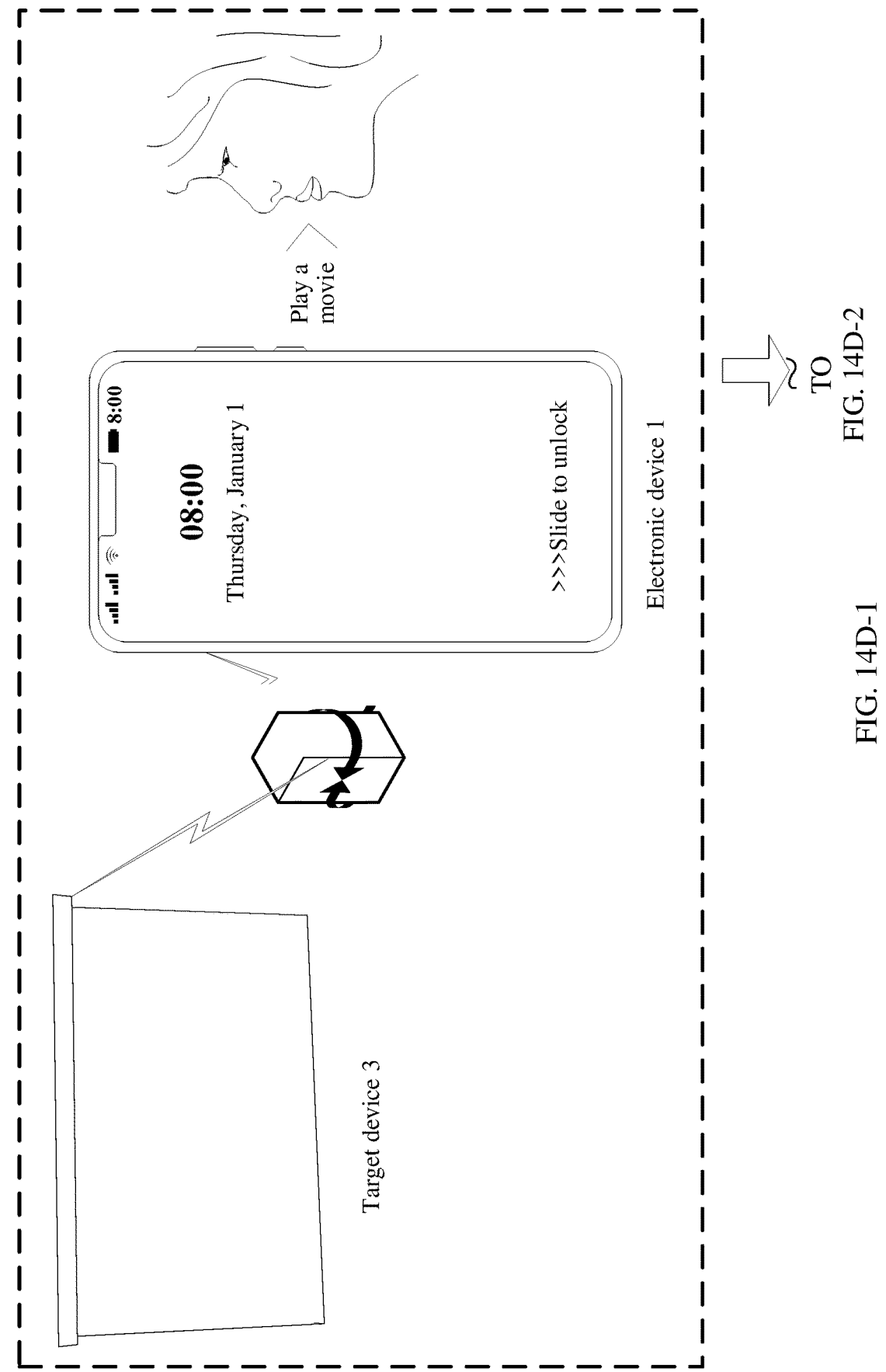
Figures 1, 2, 3, 14D:
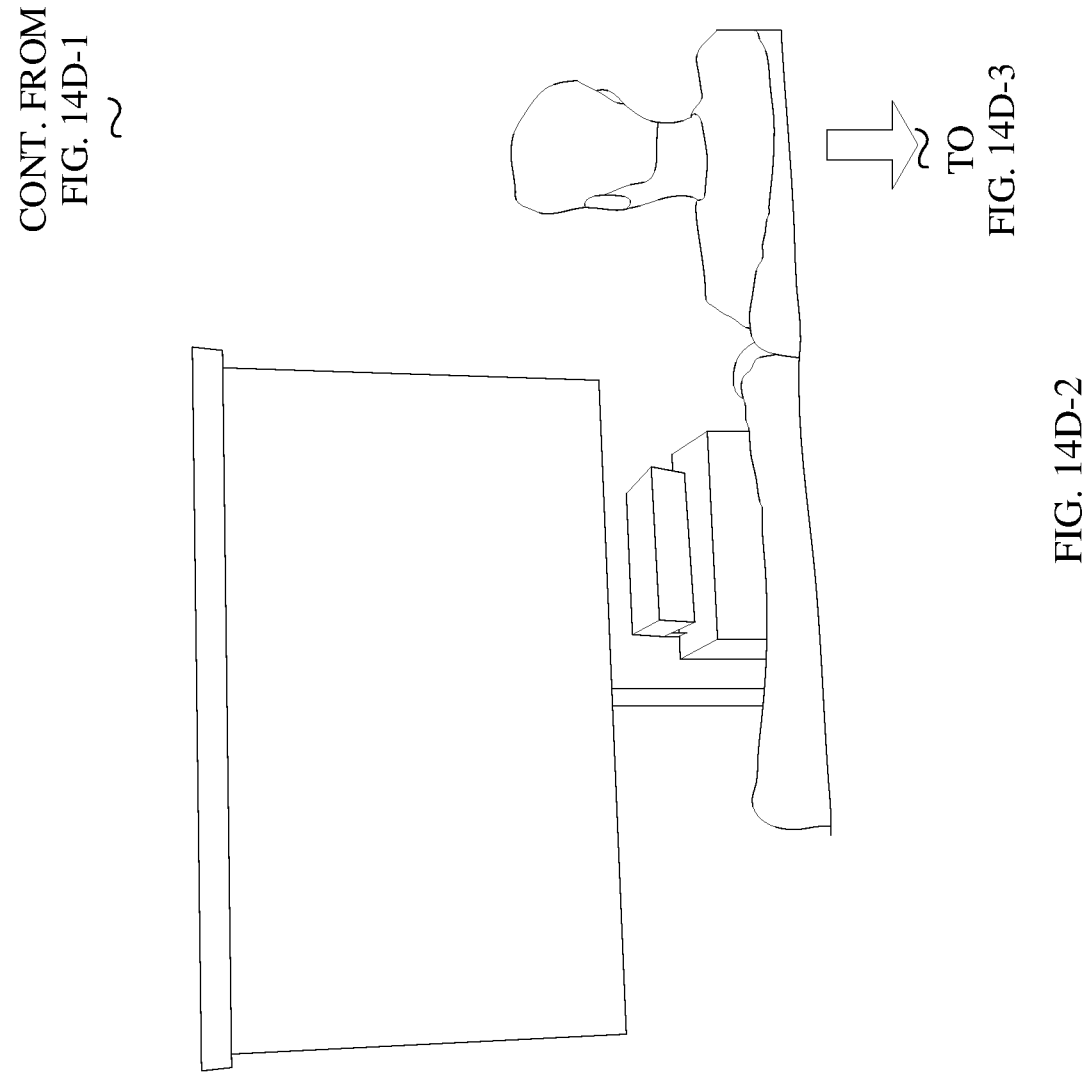
Figures 2, 3, 14D:
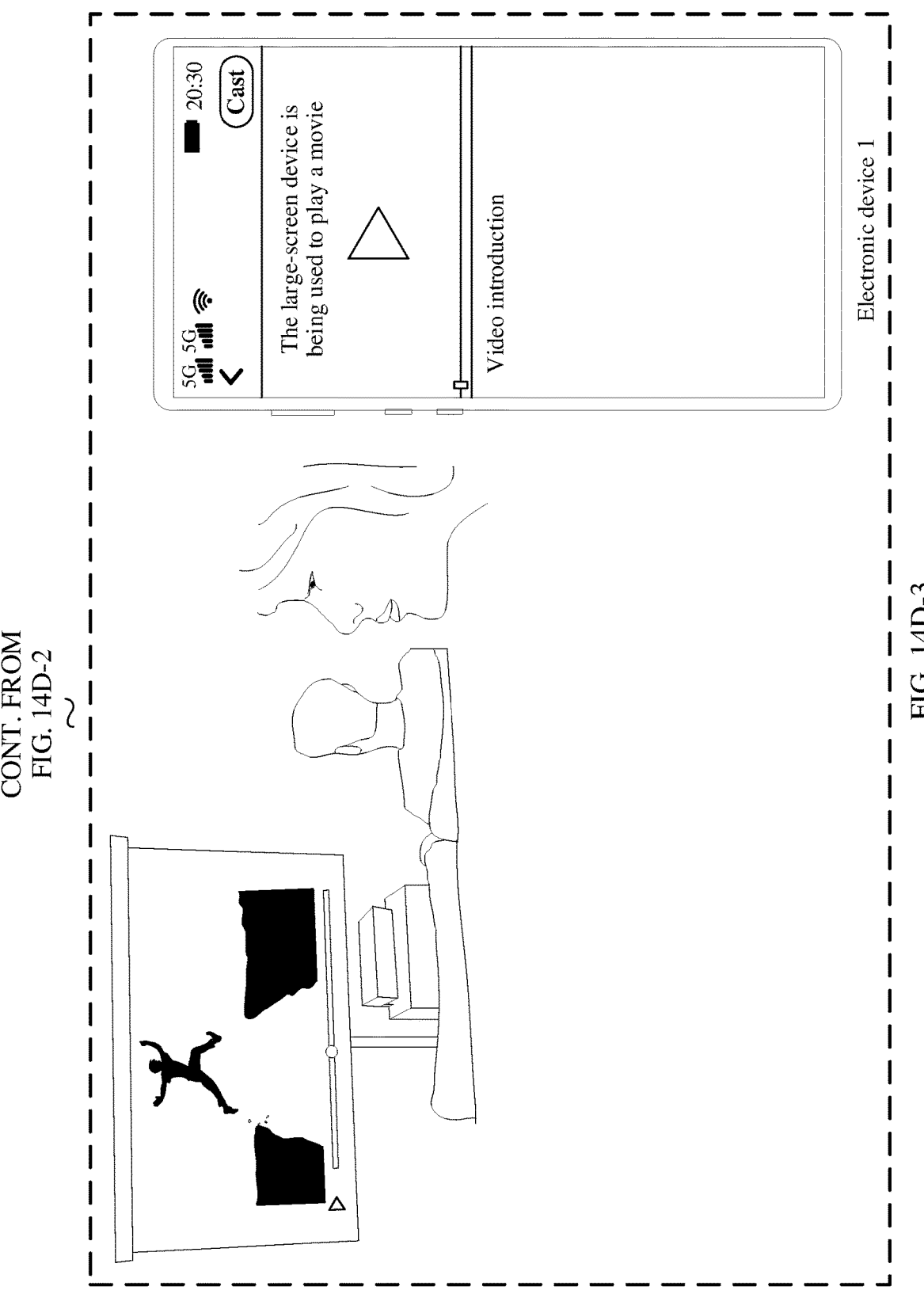

In a possible implementation, the scenario may further include at least one control device, for example, a control device 4 and a control device 5 shown in FIG. 14B. The electronic device 1 may determine that a relatively dark environment is required to play a movie. Therefore, the electronic device 1 may send a control instruction for closing a curtain to the control device 4, and send a control instruction for turning off a light to the control device 5. Therefore, the control device 4 may close the curtain based on the control instruction of the electronic device 1, and the control device 5 may turn off the light based on the control instruction of the electronic device 1. Optionally, before sending the control instructions to the control device 4 and the control device 5, the electronic device 1 may determine whether the user A agrees. For example, the electronic device 1 may display prompt messages "whether to close the curtain" and "whether to turn off the light" on the display. The user A may enter, manually or by using a voice, an instruction indicating whether to agree, and the electronic device 1 may send the control instructions to the control device 4 and the control device 5 after the user enters an instruction indicating that the user agrees.

Referring to FIG. 14C-1, FIG. 14C-2, and FIG. 14C-3, the target device 3 receives an incoming call request. A user needs to answer the incoming call request of the target device 3, and therefore the target device 3 may send a current user state to the electronic device 1, to indicate that the user currently requires a quiet external environment. The electronic device 1 may lower volume of currently played media (in a scenario shown in FIG. 14C-1, FIG. 14C-2, and FIG. 14C-3, may lower volume of a television that currently plays media) to a predetermined range based on the current user state sent by the target device 3.

Referring to FIG. 14D-1, FIG. 14D-2, and FIG. 14D-3, the user A wants to watch a movie in the living room, and therefore may wake up the electronic device 1, and enter a voice control instruction, for example, "play a movie". The electronic device 1 may determine that there is the target device 3 and the target device 4 in an area to which the electronic device 1 belongs. The target device 3 determines, by using the camera, that one or more users are in front of the large-screen device, and the target device 3 may determine that one or more users are waiting to watch a movie, and therefore may send a current user state indicating that one or more users are waiting to watch a movie to the electronic device 1. The electronic device 1 may play a movie by using the large-screen device in the current network connection.

Optionally, the target device 3 may be a large-screen device. The large-screen device may determine, by using the camera, whether there are one or more faces, or may determine, by using the camera, whether one or more users are watching the large-screen device. If the large-screen device determines that there are one or more faces, or the large-screen device determines that one or more users are watching the large-screen device, the large-screen device may determine that one or more users are currently waiting to watch a movie.

Figures 15A, 15B:
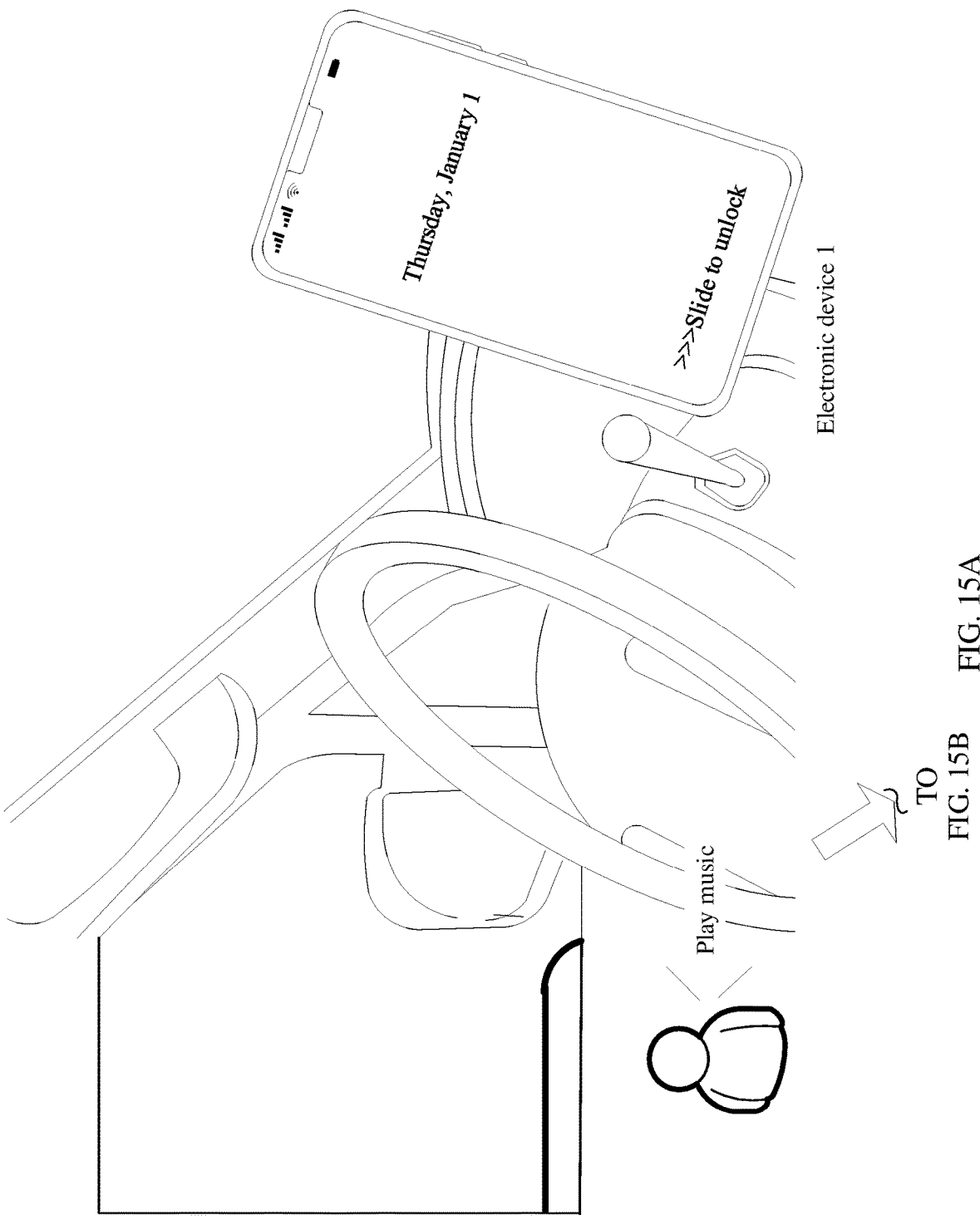
FIG. 15A and FIG. 15B are a schematic diagram of a scenario of an electronic device control method according to an embodiment of this application.
Figure 15B:
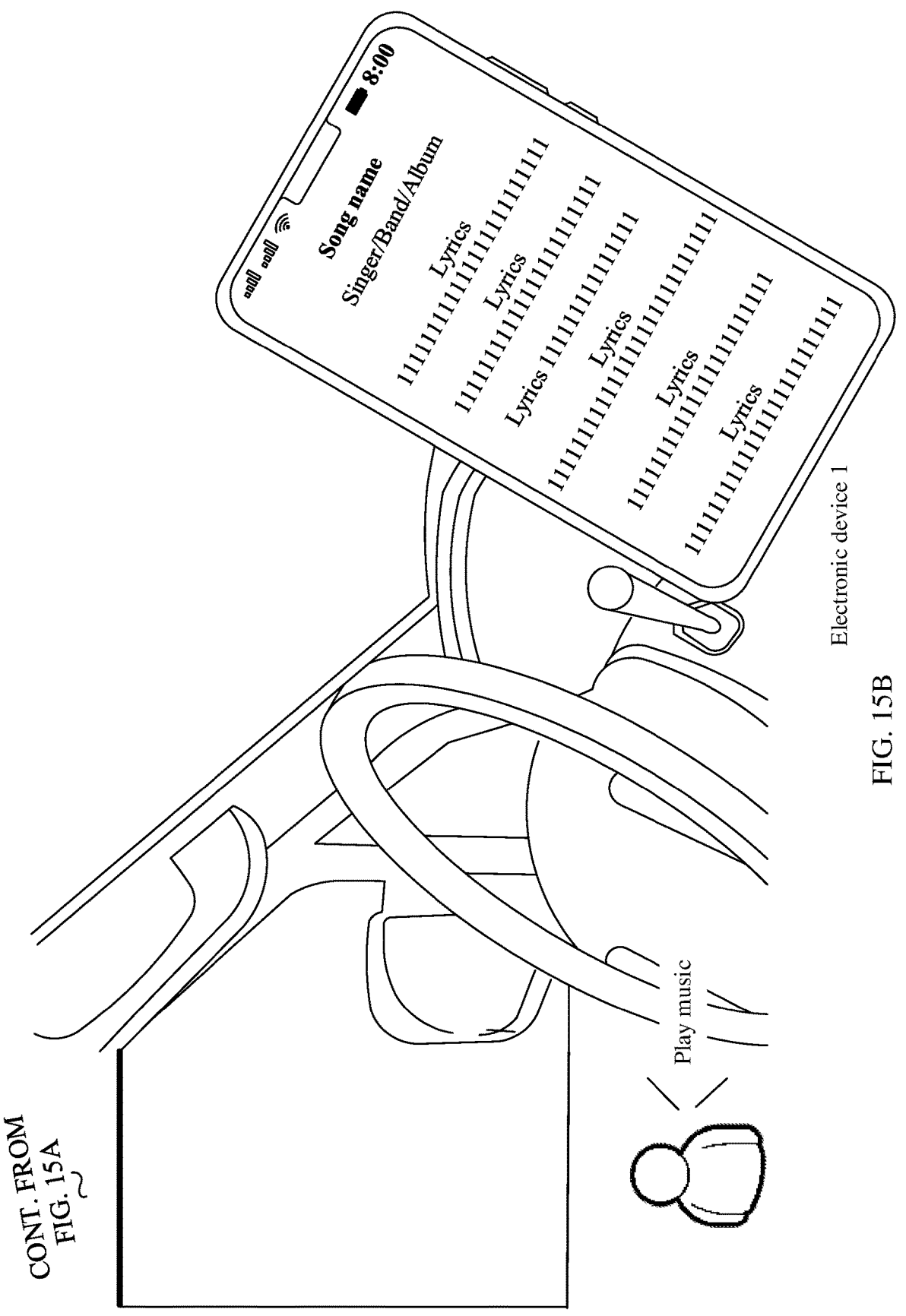

Referring to FIG. 15A and FIG. 15B, the user wants to play music in a vehicle, and therefore may wake up the electronic device 1, and enter a voice control instruction. The electronic device 1 may determine that there is no user who is currently learning, working, or sleeping, and therefore may open the application that can play music, and may play music by using a public play device 2 in the vehicle. If the electronic device 1 receives an incoming call request, the electronic device 1 may determine that a relatively quiet environment is required to answer the incoming call request. Therefore, the electronic device 1 may send a control instruction for closing a window to an in-vehicle infotainment device 3. The in-vehicle infotainment device 3 may close the window based on the control instruction sent by the electronic device 1. Optionally, before sending the control instruction for closing the window to the in-vehicle infotainment device 3, the electronic device 1 may display a control instruction "whether to close the window" on the display, and send the control instruction to the in-vehicle infotainment device 3 after the user enters an instruction indicating that the user agrees.

Figure 16:
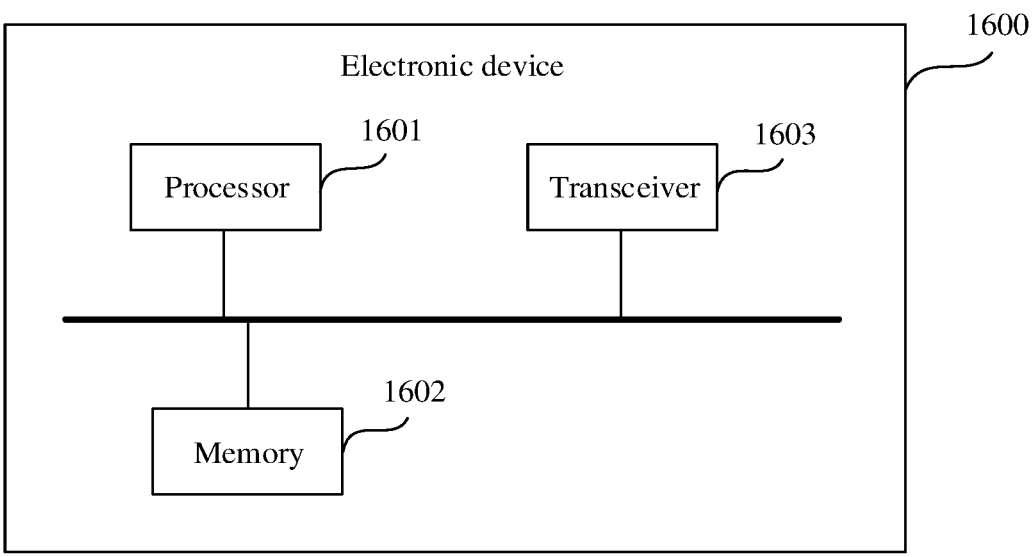
FIG. 16 is a block diagram of an electronic device according to an embodiment of this application.

As shown in FIG. 16, some other embodiments of this application disclose an electronic device 1600. The electronic device may include one or more processors 1601, one or more memories 1602, and one or more transceivers 1603. The one or more memories 1602 store one or more computer programs, and the one or more computer programs include instructions. For example, FIG. 16 shows one processor 1601 and one memory 1602. When the instructions are executed by the one or more processors 1601, the electronic device 1600 is enabled to perform the following steps: receiving a voice instruction entered by a user by using a voice assistant on the electronic device; determining a current user state of at least one user in an area to which the electronic device belongs; and responding to the voice instruction based on the current user state of the at least one user.

In a design, the processor 1601 may specifically perform the following steps: determining at least one target device in the area to which the electronic device belongs; and sending a first request message to the at least one target device by using the transceiver 1603, where the first request message is used to obtain the current user state; and the transceiver 1603 receives at least one current user state from the at least one target device.

In a design, the processor 1601 may specifically perform the following steps: if there is a first user state in the at least one current user state, performing an operation corresponding to the voice instruction, where the first user state represents a noise environment required by a user; or if there is no first user state in the at least one current user state, searching for at least one peripheral device in a current network connection; and performing, by using the at least one peripheral device, an operation corresponding to the voice instruction.

In a design, the at least one target device has a target user identifier, the electronic device has a user identifier, and the user identifier and the target user identifier are in a same voice assistant group.

In a design, the processor 1601 may specifically perform the following step: generating first information in response to the voice instruction, where the voice instruction includes event information and a time point; and the transceiver 1603 sends the first information to at least one target device.

In a design, when the instructions are executed by the one or more processors 1601, the electronic device 1600 is enabled to perform the following steps: receiving a first request message from a first electronic device, where the first request message is used by the first electronic device to obtain a current user state; obtaining the current user state; and sending the current user state to the first electronic device.

In a design, the processor 1601 may specifically perform the following steps: obtaining the current user state by using a sensor; and/or obtaining the current user state by collecting information that is set by a user.

In a design, the processor 1601 may specifically perform the following steps: receiving first information by using the transceiver 1603, where the first information includes event information and a time point; and displaying the event information based on the time point.

In a design, when the instructions are executed by the one or more processors 1601, the electronic device 1600 is enabled to perform the following steps: receiving a voice instruction entered by a user by using a voice assistant on the electronic device; and responding to the voice instruction, and sending the voice instruction to a second electronic device, where the electronic device has a first user identifier, the second electronic device has a second user identifier, and the first user identifier and the second user identifier are in a same voice assistant group.

In a design, the processor 1601 may specifically perform the following steps: generating a corresponding first message in response to the voice instruction, where the first message includes event information and a time point; and sending the first message to the second electronic device by using the transceiver 1603.

In a design, the transceiver 1603 sends, by using the voice assistant on the electronic device, the voice instruction to a voice assistant corresponding to the second user identifier.

In a design, when the instructions are executed by the one or more processors 1601, the electronic device 1600 is enabled to perform the following steps: receiving a voice instruction from a first electronic device by using the transceiver 1603; generating a first message based on the voice instruction, where the first message includes event information and a time point; and displaying the event information based on the time point; or receiving a first message from a first electronic device by using the transceiver 1603, where the first message includes event information and a time point; and displaying the event information based on the time point, where the first electronic device has a first user identifier, the electronic device has a second user identifier, and the first user identifier and the second user identifier are in a same voice assistant group.

In a design, the transceiver 1603 receives the first message from a voice assistant on the first electronic device by using a voice assistant.

It should be noted that in embodiment of this application, division into the units is an example, and is merely logical function division. During actual implementation, another division manner may be used. Functional units in embodiments of the present invention may be integrated into one processing unit, each of the units may exist alone physically, or two or more units may be integrated into one unit. For example, in the foregoing embodiments, a first obtaining unit and a second obtaining unit may be a same unit or different units. The integrated unit may be implemented in a form of hardware, or may be implemented in a form of a software functional unit.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)".

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, into which one or more usable media are integrated. The usable medium may be a magnetic medium (for example, a floppy disk, a hard disk, or a magnetic tape), an optical medium (for example, a DVD), a semiconductor medium (for example, a solid-state drive), or the like.

For a purpose of explanation, the foregoing description is provided with reference to a specific embodiment. However, the foregoing example discussion is not intended to be detailed, and is not intended to limit this application to a disclosed precise form. Based on the foregoing teaching content, many modification forms and variation forms are possible. Embodiments are selected and described to fully illustrate the principles of this application and practical application of the principles, so that another person skilled in the art can make full use of this application and various embodiments that have various modifications applicable to conceived specific usage.

What is claimed is:

1. An electronic device control method, comprising:
receiving, by an electronic device, a user identifier for each of a plurality of device users of a user group;
receiving a login to the user identifier of a first user of the user group, the user identifier for the first user including a first voice assistant of the first user;
receiving a voice instruction entered through a voice assistant on the electronic device for a second user of the user group;
receiving, by the electronic device, an indication of a current user state of a target device responsive to a first request message sent by the electronic device, wherein a second voice assistant of the second user is logged into the target device; and
transmitting information based on the voice instruction entered through the first voice assistant of the electronic device to the second voice assistant of the target device to cause the second voice assistant of the target device to execute an instruction when the current user state of the target device meets a predetermined condition.

2. The method according to claim 1, wherein the current user state is determined by the electronic device to meet a noise environment required by the second user.

3. The method according to claim 1, wherein the target device includes a target user identifier, the electronic device includes a user identifier, and the user identifier and the target user identifier are included in a common voice assistant group.

4. The method according to claim 1, wherein the voice instruction comprises event information and a time point.

5. An electronic device control method, comprising:
receiving, by a target electronic device, a first request message from a source electronic device to obtain a current user state of the target electronic device;
obtaining, by the target electronic device, the current user state of the target electronic device;

sending, by the target electronic device, the current user state of the target electronic device to the source electronic device;
receiving information from the source electronic device; and
processing, by the target electronic device, the received information to cause a voice assistant of the target electronic device to execute an instruction included in the received information when the current user state is a user state determined by the target device to be conducive for execution of the instruction by the voice assistant of the target device.

6. The method according to claim 5, wherein the obtaining the current user state of the target electronic device comprises at least one of:
using a sensor; or
collecting information from an external source.

7. The method according to claim 6, wherein the target electronic device includes a target user identifier, the source electronic device includes a user identifier, and the user identifier and the target user identifier are included in a common voice assistant group.

8. The method according to claim 7, further comprising:
receiving, by the target electronic device, first information comprising event information and a time point; and
displaying, by the target electronic device, the event information based on the time point.

9. The method according to claim 5, wherein processing by the target device of at least one of the received information or instruction included in the received instruction comprises processing voice data received from the source device.

10. An electronic device, comprising:
one or more processors;
a memory; and
one or more computer programs, the one or more computer programs being stored in the memory comprising instructions that, when executed by the one or more processors, cause the electronic device to perform the following operations:
receive a user identifier for each of a plurality of device users of a user group;
receive a login to the user identifier of a first user of the user group, the user identifier for the first user including a voice assistant of the first user;
receive a voice instruction entered through a voice assistant on-the electronic device for a second user of the user group;
receive an indication of a current user state of a target device responsive to a first request message sent by the electronic device, wherein a second voice assistant of the second user is logged into the target device; and
transmit information based on the voice instruction entered through the voice assistant of the electronic device to a voice assistant of the target device to cause the voice assistant of the target device to execute an instruction when the current user state of the target device meets a predetermined condition.

11. The electronic device according to claim 10, wherein execution of the instructions by the at least one processor further cause the electronic device to perform the following operations:
determine a plurality of target devices in an area in which the electronic device is located, wherein at least one of the plurality of target devices is associated with the second user;

send a first request message to the plurality of target devices to obtain a current user state associated with each of the plurality of target devices; and receive at least one current user state from at least one of the target devices.

12. The electronic device according to claim 10, wherein information is transmitted by the electronic device when the current user state is determined to meet a noise environment required by the second user.

13. The electronic device according to claim 10, wherein the each target device includes a target user identifier, the electronic device includes a user identifier, and the user identifier and the target user identifier are included in a common voice assistant group.

14. The electronic device according to claim 10, wherein execution of the instructions by the at least one processor further cause the electronic device to perform the following operations:

generate first information in response to the voice instruction, wherein the voice instruction comprises event information and a time point; and send the first information to the target device associated with the second user.

\* \* \* \* \*